US011835951B2

(12) United States Patent
Djuric et al.

(10) Patent No.: US 11,835,951 B2
(45) Date of Patent: *Dec. 5, 2023

(54) OBJECT MOTION PREDICTION AND AUTONOMOUS VEHICLE CONTROL

(71) Applicant: UATC, LLC, Mountain View, CA (US)

(72) Inventors: Nemanja Djuric, Pittsburgh, PA (US); Vladan Radosavljevic, Pittsburgh, PA (US); Thi Duong Nguyen, Pittsburgh, PA (US); Tsung-Han Lin, San Francisco, CA (US); Jeff Schneider, Pittsburgh, PA (US); Henggang Cui, Allison Park, PA (US); Fang-Chieh Chou, San Francisco, CA (US); Tzu-Kuo Huang, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/466,705

(22) Filed: Sep. 3, 2021

(65) Prior Publication Data

US 2021/0397185 A1    Dec. 23, 2021

Related U.S. Application Data

(63) Continuation of application No. 16/122,455, filed on Sep. 5, 2018, now Pat. No. 11,112,796, which is a
(Continued)

(51) Int. Cl.
*G05D 1/00* (2006.01)
*G05D 1/02* (2020.01)
(Continued)

(52) U.S. Cl.
CPC ..... *G05D 1/0088* (2013.01); *B60W 60/00274* (2020.02); *G01C 21/3407* (2013.01);
(Continued)

(58) Field of Classification Search
CPC .. G05D 1/0246; G05D 1/0221; G05D 1/0214; G05D 1/0251; G05D 1/0088;
(Continued)

(56) References Cited

U.S. PATENT DOCUMENTS 6,366,701 B1 *  4/2002  Chalom ................. G06V 40/20
                                                      382/107
9,248,834 B1 *  2/2016  Ferguson .......... B60W 60/0027
(Continued)

FOREIGN PATENT DOCUMENTS

CN      112572451 A  *  3/2021  ........ B60W 30/0956
EP       3783538 A1  *  2/2021  ........... G06N 3/0445

OTHER PUBLICATIONS

Dequaire et al., "Deep Tracking on the Move: Learning to Track the World from a Moving Vehicle Using Recurrent Neural Networks", arXiv:1609.09365v1, Sep. 29, 2016, 7 pages.
(Continued)

*Primary Examiner* — Dale W Hilgendorf
(74) *Attorney, Agent, or Firm* — Dority & Manning, P.A.

(57) ABSTRACT

Systems and methods for predicting object motion and controlling autonomous vehicles are provided. In one example embodiment, a computer implemented method includes obtaining state data indicative of at least a current or a past state of an object that is within a surrounding environment of an autonomous vehicle. The method includes obtaining data associated with a geographic area in which the object is located. The method includes generating a combined data set associated with the object based at least in part on a fusion of the state data and the data associated with the geographic area in which the object is located. The method includes obtaining data indicative of a machine-learned model. The method includes inputting the combined data set into the machine-learned model. The method includes receiving an output from the machine-learned
(Continued)

model. The output can be indicative of a plurality of predicted trajectories of the object.

18 Claims, 9 Drawing Sheets

Related U.S. Application Data continuation-in-part of application No. 15/783,005, filed on Oct. 13, 2017, now Pat. No. 10,656,657.

(60) Provisional application No. 62/542,506, filed on Aug. 8, 2017.

(51) Int. Cl.
*G01C 21/34* (2006.01)
*G06N 20/00* (2019.01)
*B60W 60/00* (2020.01)
*G06N 3/08* (2023.01)
*B60W 30/18* (2012.01)

(52) U.S. Cl.
CPC ....... *G01C 21/3492* (2013.01); *G05D 1/0221* (2013.01); *G05D 1/0231* (2013.01); *G06N 20/00* (2019.01); *B60W 30/18159* (2020.02); *B60W 2556/20* (2020.02); *G05D 2201/0213* (2013.01); *G06N 3/08* (2013.01)

(58) Field of Classification Search
CPC ............... G05D 1/0276; G05D 1/0231; G05D 2201/0213; G06K 9/00369; G06K 9/00805; G06K 9/6288; G06K 9/6256; G06K 9/00335; G06K 2209/21; B60W 60/00274; B60W 30/18159; B60W 2556/20; G01C 21/3407; G01C 21/3492; G06N 20/00; G06N 3/08
See application file for complete search history.

(56) References Cited

U.S. PATENT DOCUMENTS

| | | | |
|---|---|---|---|
| 10,037,613 B1* | 7/2018 | Becker | G06T 7/60 |
| 10,065,638 B1* | 9/2018 | Wood | B60W 30/09 |
| 10,127,465 B2* | 11/2018 | Cohen | G06T 7/73 |
| 10,656,657 B2 | 5/2020 | Djuric et al. | |
| 11,112,796 B2* | 9/2021 | Djuric | G06N 20/00 |
| 11,195,418 B1* | 12/2021 | Hong | G08G 1/166 |
| 11,535,253 B2* | 12/2022 | Qiao | B60W 30/18163 |
| 2009/0138151 A1* | 5/2009 | Smid | G01S 5/14 701/467 |
| 2017/0050638 A1* | 2/2017 | Gordon | B60K 35/00 |
| 2017/0131719 A1* | 5/2017 | Micks | B60W 60/0015 |
| 2018/0004223 A1* | 1/2018 | Baldwin | G05D 1/0248 |
| 2018/0012082 A1* | 1/2018 | Satazoda | G06V 10/763 |
| 2018/0074505 A1* | 3/2018 | Lv | G05D 1/0246 |
| 2018/0173971 A1* | 6/2018 | Jia | G06V 10/454 |
| 2018/0268584 A1 | 9/2018 | Bobovich et al. | |
| 2018/0284769 A1 | 10/2018 | Wang et al. | |
| 2019/0049970 A1 | 2/2019 | Djuric et al. | |
| 2019/0152490 A1* | 5/2019 | Lan | G05D 1/0088 |
| 2019/0384304 A1* | 12/2019 | Towal | G06N 3/045 |
| 2020/0110416 A1* | 4/2020 | Hong | G01C 21/3602 |
| 2020/0159225 A1* | 5/2020 | Zeng | G01C 21/3453 |
| 2020/0249684 A1* | 8/2020 | Onofrio | G05D 1/0219 |
| 2021/0009163 A1* | 1/2021 | Urtasun | G08G 1/0141 |
| 2021/0090447 A1 | 3/2021 | Gnoth | |
| 2021/0269059 A1* | 9/2021 | Djuric | G06N 3/088 |
| 2021/0341920 A1* | 11/2021 | Singh | B60W 50/0097 |
| 2022/0011122 A1* | 1/2022 | He | G06N 3/044 |
| 2022/0396290 A1* | 12/2022 | Oh | B60W 60/0015 |
| 2023/0040006 A1* | 2/2023 | Weiss | G06N 3/045 |
| 2023/0082079 A1* | 3/2023 | Douillard | G06T 7/20 382/155 |

OTHER PUBLICATIONS

Held et al., "Learning to Track at 100 FPS with Deep Regression Networks", arXiv:1604.01802v2, Aug. 16, 2016, 26 pages.

Milan et al., "Online Multi-Target Tracking Using Recurrent Neural Networks", arXiv:1604.03635v1, Apr. 13, 2016, 17 pages.

Ondruska et al., "Deep Tracking: Seeing Beyond Seeing Using Recurrent Neural Networks", Thirtieth AAAI Conference on Artificial Intelligence, Phoenix, Arizona, Feb. 12-17, 2016, 7 pages.

Ondruska et al., "End-to-End Tracking and Semantic Segmentation Using Recurrent Neural Networks", arXiv:1604.05091v1, Apr. 18, 2016, 9 pages.

Lui, et al., "SSD: Single Shot MultiBox Detector", arXiv:1512.02325v5, Dec. 29, 2016, 17 pages.

Redmond, et al. "You Only Look Once: Unified, Real-Time Object Detection", arXiv:1506.02640v5, May 9, 2016, 10 pages.

Ren, et al. "Faster R-CNN: Towards Real-Time Object Detection with Region Proposal Networks", arXIV:1506.01497v3, Jan. 6, 2016, 14 pages.

\* cited by examiner

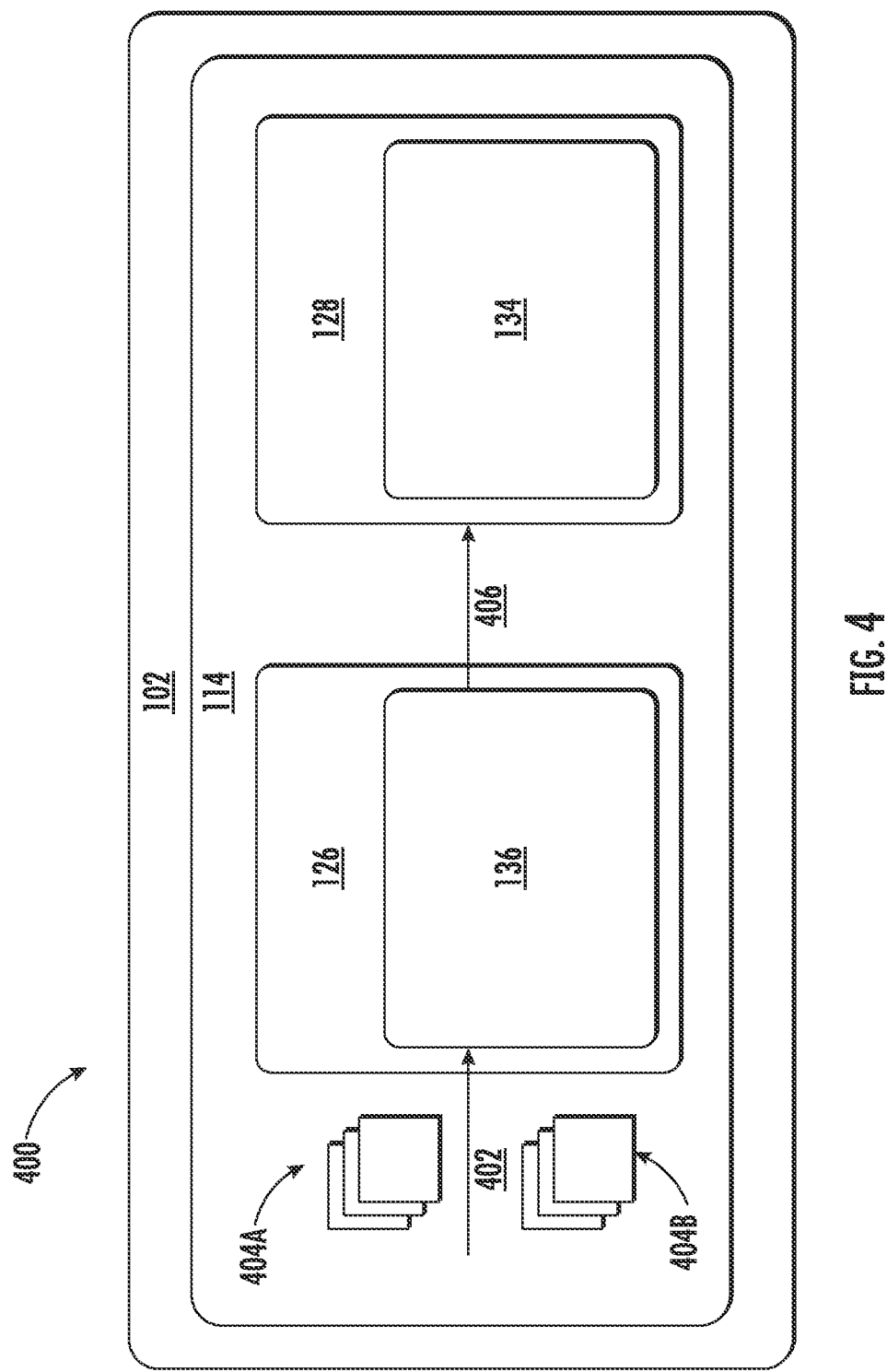

OBJECT MOTION PREDICTION AND AUTONOMOUS VEHICLE CONTROL

PRIORITY CLAIM

The present application is based on and claims priority to U.S. Provisional Application 62/542,506 having a filing date of Aug. 8, 2017 and U.S. Pat. No. 10,656,657 having a filing date of Oct. 13, 2017. The present application is a continuation-in-part application of U.S. Pat. No. 11,112,796 having a filing date of Sep. 5, 2018. All of these applications and patents are incorporated by reference herein.

FIELD

The present disclosure relates generally to predicting the motion of objects proximate to an autonomous vehicle and controlling the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by a computing system including one or more computing devices, state data indicative of at least a current or a past state of an object that is within a surrounding environment of an autonomous vehicle. The method includes obtaining, by the computing system, data associated with a geographic area in which the object is located. The method includes generating, by the computing system, a combined data set associated with the object based at least in part on a fusion of the state data and the data associated with the geographic area in which the object is located. The method includes obtaining, by the computing system, data indicative of a machine-learned model. The method includes inputting, by the computing system, the combined data set into the machine-learned model. The method includes receiving, by the computing system, an output from the machine-learned model. The output is indicative of a plurality of predicted trajectories of the object.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining state data associated with an object that is within a surrounding environment of an autonomous vehicle. The operations include obtaining data associated with a geographic area in which the object is located. The operations include generating image data associated with the object based at least in part on a fusion of the state data associated with the object and the data associated with the geographic area in which the object is located. The operations include determining a plurality of predicted trajectories of the object based at least in part on the image data associated with the object and a machine-learned model. The operations include determining a selected predicted trajectory of the object from among the plurality of predicted trajectories of the object. The operations include planning a motion of the autonomous vehicle based at least in part on the selected predicted trajectory of the object.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include obtaining state data associated with an object that is within a surrounding environment of the autonomous vehicle. The operations include obtaining data associated with a geographic area in which the object is located. The operations include generating a combined data set associated with the object based at least in part on the state data associated with the object and the data associated with the geographic area in which the object is located. The combined data set includes one or more rasterized images that include the object. The one or more rasterized images is indicative of the state data associated with the object and the data associated with the geographic area in which the object is located at various times. The operations include determining a plurality of predicted trajectories of the object based at least in part on the one or more rasterized images that include the object and a machine-learned model. Each of the predicted trajectories includes a plurality of predicted waypoints of the object.

Other example aspects of the present disclosure are directed to systems, methods, vehicles, apparatuses, tangible, non-transitory computer-readable media, and memory devices for predicting object motion and controlling autonomous vehicles with respect to the same. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 depicts a diagram of an example implementation of a machine-learned model according to example embodiments of the present disclosure;

DETAILED DESCRIPTION

Figure 1:
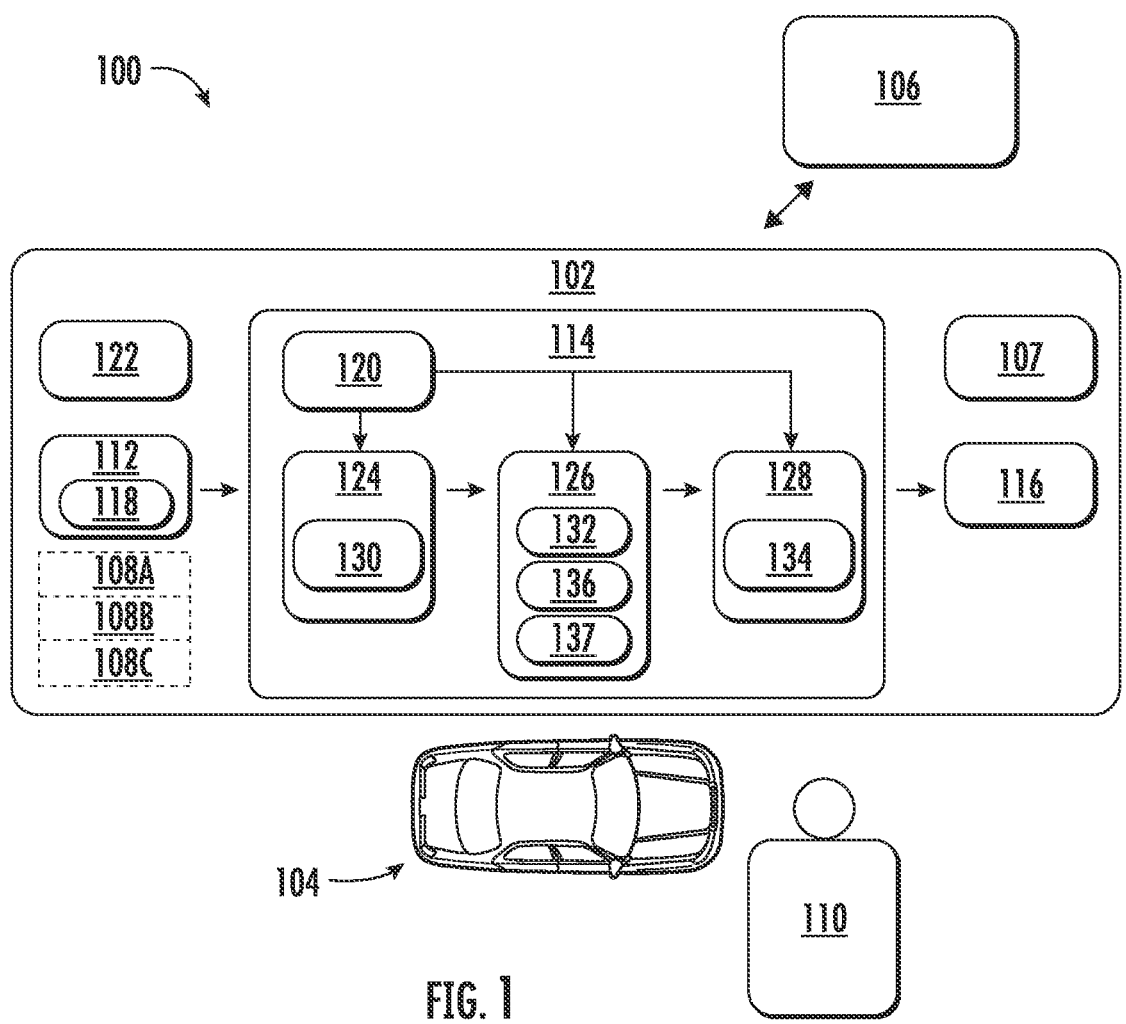
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to predicting the moving trajectory of objects that are within the surrounding environment of an autonomous vehicle and controlling the motion of the autonomous vehicle with respect to such predictions. For instance, an autonomous vehicle can be a vehicle that can drive, navigate, operate, etc. with little to no human input. To do so, the autonomous vehicle can perform various actions to autonomously navigate through its surroundings and the objects included therein. The systems and methods of the present disclosure herein can enable an autonomous vehicle to predict the respective motion of these objects and plan the vehicle's motion accordingly. For example, the autonomous vehicle can use sensor data acquired onboard the autonomous vehicle to help generate state data that describes current and/or past states of an object within the surrounding environment of the vehicle. The autonomous vehicle can fuse the state data with data associated with a geographic area in which the object is located (e.g., map data, satellite imagery, etc.) to create a combined data set. Such a fusion can project the data associated with the geographic area onto the state data such that the states of the object can be better evaluated within the context of the object's surroundings (e.g., relative to a side walk, lane boundaries, obstruction, etc.). The combined data set can include image data associated with a plurality of times (e.g., a plurality of multi-color rasterized images each associated with a point in time). The autonomous vehicle can input the combined data set into a machine-learned model to predict how an object is likely to move relative to the characteristics of the geographic area (e.g., how a pedestrian will move relative to a sidewalk with an obstruction, wall, curb, etc.). The machine-learned model can output one or more predicted future locations of the object (e.g., a predicted object trajectory), which the autonomous vehicle can use to plan and control its motion (e.g., to avoid the object). Accordingly, the systems and methods described herein can improve the speed, quality, and/or accuracy of the generated predictions. Moreover, the improved ability to predict future object location(s) can enable improved motion planning or other control of the autonomous vehicle, thereby enhancing vehicle/passenger/object safety and vehicle efficiency.

More particularly, an autonomous vehicle can be a ground-based autonomous vehicle (e.g., car, truck, bus, etc.) or another type of vehicle (e.g., aerial vehicle) that can operate with minimal and/or no interaction from a human operator. The autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain), etc. The sensor(s) can gather sensor data (e.g., image data, RADAR data, LIDAR data, etc.) associated with the surrounding environment of the vehicle. For example, the sensor data can include LIDAR point cloud(s) and/or other data associated with one or more object(s) that are proximate to the autonomous vehicle (e.g., within a field of view of the sensor(s)) and/or one or more geographic characteristics of the geographic area (e.g., curbs, lane markings, sidewalks, etc.). The object(s) can include, for example, other vehicles, pedestrians, bicycles, etc. The sensor data can be indicative of characteristics (e.g., locations) associated with the object(s) at one or more times. The sensor(s) can provide such sensor data to the vehicle's autonomy computing system.

In addition to the sensor data, the autonomy computing system can retrieve or otherwise obtain other types of data associated with the geographic area in which the objects (and/or the vehicle) are located. For example, the autonomy computing system can obtain map data that provides detailed information about the surrounding environment of the autonomous vehicle. The map data can provide information regarding: the identity and location of different roadways, road segments, buildings, sidewalks, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); the location of obstructions (e.g., roadwork, accident, etc.) and/or any other map data that provides information that assists the computing system in comprehending and perceiving its surrounding environment and its relationship thereto. In some implementations, the autonomy computing system can obtain satellite imagery of the geographic area (e.g., overhead imagery) in which the object(s) and/or the autonomous vehicle is located.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive one or more objects within the surrounding environment of the autonomous vehicle. For instance, the perception system can process the sensor data from the sensor(s) to detect the one or more objects that are proximate to the autonomous vehicle as well as state data associated therewith. The state data can be indicative of at least a current or past state of an object that is within the surrounding environment of the autonomous vehicle. For example, the state data for each object can describe an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information.

The prediction system can be configured to predict a motion of the object(s) within the surrounding environment of the autonomous vehicle. For instance, the prediction system can create predicted data associated with one or more of the objects. The predicted data can be indicative of one or more predicted future locations of each respective object. The predicted data can indicate a predicted path associated with each object. The predicted path can be indicative of a trajectory along which the respective object is predicted to travel over time (and/or the speed at which the object is predicted to travel along the predicted path).

To help generate such predictions, the prediction system can include, employ, and/or otherwise leverage a model. In particular, the model can be a machine-learned model. For example, the machine-learned model can be or can otherwise include one or more various model(s) such as, for example, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks. For instance, supervised training techniques can be performed to train the model to predict one or more future locations of object(s) within the surrounding environment of the autonomous vehicle (e.g., using labeled state data and geographic data with known future location(s) and/or trajectories).

The autonomy computing system can generate a specific data set to be used as an input into the machine-learned model. For instance, the autonomy computing system can generate a combined data set associated with the object. The combined data set can be based at least in part on the state data associated with the object (e.g., obtained via the perception system) and the data associated with the geographic area in which the object is located (e.g., sensor data, map data, satellite imagery, etc.). By way of example, the autonomy computing system can fuse the data associated with the geographic area with the state data so that the data associated with the geographic area is projected onto the state data (e.g., to a coordinate system associated with the object). Such fusion can provide a more accurate context of the object's current and/or past state(s) within the geographic area. In some implementation, the combined data set can include image data encoded with the state data, the data associated with the geographic area, and/or other features. For example, the combined data set can be encoded with features such as the object heading(s), object location(s), object orientation(s), travel way types (e.g., road, bike path, sidewalk, crosswalk, etc.), travel way headings, travel way boundaries, traffic light states (e.g., green, yellow, red, etc.), and/or other features. The features associated with the object can be relative to the geographic area such as, for example, object location(s) (e.g., pedestrian locations) relative to a travel way boundary (e.g., sidewalk boundary).

In some implementations, the combined data set (e.g., the image data) can include a plurality of images based on the fusion of the state data and the data associated with the geographic area. Each image can be, for example, a rasterized image where each pixel corresponds to a spatial area or volume (e.g., certain coordinates, etc.). In some implementations, a rasterized image can be a top-view image frame that includes the object and the surrounding environment. The rasterized image can be encoded with one or more features, each encoded to a different channel of a plurality of channels of the image. For example, feature(s) for each particular spatial area or volume can be encoded in the corresponding pixel data via different channels (e.g., for each pixel). In some implementations, the plurality of channels of an image can include a plurality of color channels. Each color channel can be associated with a different color and each color channel can be encoded with a different feature. For example, a sidewalk can be represented by an orange color, while a roadway can be represented by a grey color.

The combined data set can be indicative of the state of the object within the geographic area at a plurality of times. For example, as described herein the combined data set can include a plurality of images (e.g., rasterized images) associated with the object, generated from the state data and the data associated with the geographic area. Each image associated with the object can be associated with a point in time. As such, the model can evaluate the state(s) of the object within the geographic area as a progression of time. The combined data set can be specific to a particular object, rather than the entire surrounding environment of the autonomous vehicle. For example, each image can be indicative of a snapshot of the object and the area immediately around the object (e.g., 25, 50, 100 m, etc.), rather than the entire surrounding environment of the autonomous vehicle. This enables the autonomy computing system to focus its processing resources (e.g., when running the machine-learned model) on predicting the future location(s) of an individual object, rather than the future states of the entire surrounding environment.

The prediction system can input the combined data set (e.g., the image data) into the machine-learned model. For example, the machine-learned model can be configured to receive the one or more features of the combined data set (e.g., the plurality of rasterized images) via one or more separate channel(s). In some implementations, the channels and/or input data can feed into the initial layer of a multi-layer machine-learned model. Additionally, or alternatively, the channels and/or input data can feed into an intermediate layer.

The prediction system can receive an output from the machine-learned model based on the combined data set. The output can be indicative of one or more predicted future locations of the object. For instance, the machine-learned model can determine one or more predicted future locations of the object based at least in part on the features extracted from the combined data set (e.g., the image data). For instance, the machine-learned model can include a convolution neural network configured convolve over the combined data set (e.g., plurality of rasterized images) to determine the one or more predicted future locations of the objects based on the information encoded in the combined data set. The machine-learned model can analyze the combined data set to predict a path of the object based on the locations, headings, velocities, etc. indicated in the state data and further refine that prediction with the data associated with the geographic area (e.g., map data). By way of example, the model can predict that a pedestrian is more likely to travel along a sidewalk, within the boundaries of the sidewalk (e.g., between a curb and a wall adjacent to the sidewalk). In the event that the data associated with the geographic area (e.g., the map data) indicates that there is an obstruction blocking a portion of the sidewalk (e.g., due to construction/repair), the model can evaluate the combined data set to determine that the pedestrian is likely to travel around the obstruction by walking within an adjacent bike lane and then returning to the sidewalk after the pedestrian passes the obstruction. The output of the machine-learned model can be indicative of a plurality of predicted future locations of the object. The predicted future locations can be indicative of a predicted trajectory of the object (e.g., travel along the sidewalk, within the bike lane, and returning to the sidewalk). In some implementations, the output can also, or alternatively, indicate a predicted heading, speed, and/or bounding shape associated with the object.

In some implementations, the model can determine and output a plurality of predicted paths (e.g., motions trajectories) of an object. The output can also be indicative of a confidence level associated with predicted path (e.g., motion trajectory). A confidence level can be indicative of the model's uncertainty with respect to a particular predicted path. In some implementations, the output can indicate a predicted heading, speed, and/or bounding shape associated with the object for each predicted path. The prediction system can receive the output indicative of the plurality of predicted paths and select one of the predicted paths (e.g., based on the confidence level). The prediction system can provide data indicative of the plurality of predicted paths to the motion planning system, which can, for example, weigh each of the predicted paths and confidence levels when planning vehicle motion.

The motion of the autonomous vehicle can be controlled based at least in part on the output from the machine-learned model. For example, the prediction system can provide data indicative of the one or more predicted future locations to a motion planning system of the autonomous vehicle. The motion planning system can generate a motion plan for the autonomous vehicle based at least in part on the data indicative of the predicted trajectory (e.g., future location(s)) of the object. For instance, given the predictions about the future location(s) of objects, the motion planning system can determine a motion plan for the autonomous vehicle that best navigates the vehicle relative to the objects at their future location(s). By way of example, in the event that the a predicted trajectory indicates that a pedestrian will travel within a bike lane adjacent to the vehicle's travel way (e.g., to bypass an obstruction in a sidewalk), the motion plan can include one or more vehicle trajectories that would cause the vehicle to nudge away from the pedestrian (within the vehicle's travel way) in order to increase the distance between the vehicle and the predicted location(s) of the pedestrian, as the vehicle passes the pedestrian. Additionally, or alternatively, the motion plan may include a lane change and/or a vehicle stop in light of the predicted trajectory of the pedestrian. The motion plan can be provided to a vehicle controller that is configured to implement the motion plan. For example, the vehicle controller can translate the motion plan into instructions for the appropriate vehicle controls (e.g., acceleration control, brake control, steering control, etc.).

The systems and methods described herein provide a number of technical effects and benefits. For instance, the present disclosure provides systems and methods for improved predictions of the future location(s) of objects within the surrounding environment of the autonomous vehicles and improved vehicle control. In particular, by fusing state data with data associated with the geographic area and/or using machine-learned models, the systems and methods of the present disclosure can better predict one or more future locations of an object. The improved ability to predict future object location(s) can enable improved motion planning or other control of the autonomous vehicle based on such predicted future object locations, thereby further enhancing passenger safety and vehicle efficiency. Moreover, the systems and methods of the present disclosure enable a computing system to perform prediction of future object locations with levels of accuracy and precision that were heretofore unobtainable using existing computers. Thus, the present disclosure improves the operation of an autonomous vehicle computing system and the autonomous vehicle it controls. In addition, the present disclosure provides a particular solution to the problem of object location prediction and provides a particular way (e.g., use of specific combined data within machine-learned models) to achieve the desired outcome. The present disclosure also provides additional technical effects and benefits, including, for example, enhancing passenger/vehicle safety and improving vehicle efficiency by reducing collisions.

The systems and methods of the present disclosure also provide an improvement to vehicle computing technology, such as autonomous vehicle computing technology. For instance, the systems and methods enable the vehicle technology to more accurately predict future locations of objects, while reducing the computational resources needed to do so. In particular, a computing system (e.g., vehicle computing system) can obtain state data indicative of at least a current or past state of an object that is within the surrounding environment of an autonomous vehicle, as well as data associated with a geographic area in which the object is located. The computing system can generate a combined data set (e.g., image data, rasterized images, etc.) associated with the object based at least in part on a fusion of the state data and the data associated with the geographic area. The computing system can obtain data indicative of a machine-learned model to help predict the future location(s) of the object. For instance, the computing system can input the combined data set into the machine-learned model and receive, from the model, an output indicative of a predicted trajectory of the object (e.g., based on the combined data set). The operation of the computing system (e.g., the vehicle computing system) can be improved via use of the combined data set. For example, the data fusion described herein helps creates a better input for a machine-learned model to predict the movements of the object within the context of the geographic area. For example, the combined data set can allow the model to more easily determine the past and/or current locations of the object relative to sidewalks, roads, bike lanes, walls, obstructions, and/or other characteristics of the geographic area. The combined data set is also specific to the object and its relevant surrounding environment. Such a focused processing approach can increase computational speeds as well as provide more accurately predicted object trajectories. Additionally, use of a machine-learned model as described herein can allow for parallelization of the process, rather than being run in sequence. Moreover, the combined data set can allow the model's network to be smaller and, thus, use less computational resources (e.g., processing, storage, etc.) and run more efficiently. This improvement is particularly advantageous for a vehicle computing system because the vehicle computing system has limited computational resources onboard the vehicle and is running in real-time, as the vehicle is travelling.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104.

In some implementations, the vehicle 104 can be associated with an entity (e.g., a service provider, owner, manager). The entity can be one that provides one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which the user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user 110.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as coordinating vehicles to provide vehicle services.

The vehicle 104 can include a communications system 107 configured to allow the vehicle computing system 102 (and its computing device(s)) to communicate with other computing devices. The vehicle computing system 102 can use the communications system 107 to communicate with the operations computing system 106 and/or one or more other remote computing device(s) over one or more networks (e.g., via one or more wireless signal connections). In some implementations, the communications system 107 can allow communication among one or more of the system(s) on-board the vehicle 104. The communications system 107 can also be configured to enable the autonomous vehicle to communicate and/or otherwise receive data from other computing devices (e.g., a user device). The communications system 107 can include any suitable components for interfacing with one or more network(s), including, for example, transmitters, receivers, ports, controllers, antennas, and/or other suitable components that can help facilitate communication.

The vehicle 104 incorporating the vehicle computing system 102 can be a ground-based autonomous vehicle (e.g., car, truck, bus, etc.), an air-based autonomous vehicle (e.g., airplane, drone, helicopter, or other aircraft), or other types of vehicles (e.g., watercraft, etc.). The vehicle 104 can be an autonomous vehicle that can drive, navigate, operate, etc. with minimal and/or no interaction from a human operator. In some implementations, a human operator can be omitted from the vehicle 104 (and/or also omitted from remote control of the vehicle 104).

The vehicle 104 can be configured to operate in a plurality of operating modes 108A-C. The vehicle 104 can be configured to operate in a fully autonomous (e.g., self-driving) operating mode 108A in which the vehicle 104 can drive and navigate with no input from a user 110 present in the vehicle 104 (and/or at a remote location). The vehicle 104 can be configured to operate in a semi-autonomous operating mode 108B in which the vehicle 104 can operate with some input from a user 110 present in the vehicle 104 (and/or at a remote location). The vehicle 104 can enter into a manual operating mode 108C in which the vehicle 104 is fully controllable by a user 110 (e.g., human operator) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode 108C to help assist the operator of the vehicle 104.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode 108A. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for predicting object motion and controlling an autonomous vehicle.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a LIDAR system, a RADAR system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, vehicles, pedestrians, bicycles, and/or other objects. The object(s) can be located in front of, to the rear of, above, below, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114. In addition to the sensor data 118, the autonomy computing system 114 can retrieve or otherwise obtain other types of data associated with a geographic area in which the objects (and/or the vehicle 104) are located. For example, the autonomy computing system 114 can obtain map data 120 that provides detailed information about the surrounding environment of the vehicle 104. The map data 120 can provide information regarding: the identity and location of different roadways, road segments, buildings, sidewalks, walls, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); the location of obstructions (e.g., roadwork, accident, etc.) and/or any other map data that provides information that assists the computing system in comprehending and perceiving its surrounding environment and its relationship thereto. In some implementations, the autonomy computing system 114 can obtain satellite imagery of a geographic area (e.g., overhead imagery) in which the object(s) and/or the autonomous vehicle is located. The satellite imagery can be provided to the vehicle computing system 102 from the operations computing system 106 and/or other computing device(s) that are remote from the vehicle 104.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP/MAC address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to one or more remote computing device(s) (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan. The autonomy computing system 114 can identify one or more objects that are proximate to the vehicle 104 based at least in part on the sensor data 118 and/or the map data 120. For example, the perception system 124 can process the sensor data 118 to detect one or more objects that are within the surrounding environment of the vehicle 104 as well as state data 130 associated therewith. The state data 130 can be indicative of at least a current or past state of an object that is within the surrounding environment of the vehicle 104. For example, the state data 130 for each object can describe an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information. The perception system 124 can provide the state data 130 to the prediction system 126.

The prediction system 126 can create predicted data 132 associated with each of the respective one or more objects proximate to the vehicle 104. The predicted data 132 can be indicative of one or more predicted future locations of each respective object that are determined as further described herein. The predicted data 132 can be indicative of a predicted trajectory (e.g., predicted path) of at least one object within the surrounding environment of the vehicle 104. For example, the predicted trajectory can indicate a path along which the respective object is predicted to travel over time. In some implementations, the predicted data 132 can indicate the speed at which the object is predicted to travel along the predicted trajectory. The prediction system 126 can provide the predicted data 132 associated with the object(s) to the motion planning system 128, for generation of a motion plan 134, as further described herein.

The vehicle computing system 102 (e.g., the prediction system 126 of the autonomy system 114) can include, employ, and/or otherwise leverage a model 136 to help generate the predicted data 132. In particular, the model 136 can be a machine-learned model. For example, the machine-learned model can be or can otherwise include one or more various model(s) such as, for example, neural networks (e.g., deep neural networks), or other multi-layer non-linear models. The machine-learned model can include neural networks such as, for example, a convolutional neural networks, recurrent neural networks (e.g., long short-term memory recurrent neural networks), feed-forward neural networks, and/or other forms of neural networks. For instance, supervised training techniques can be performed to train the model 136 to predict a future trajectory of object(s) within the surrounding environment of the vehicle 104. By way of example, the model 136 can be trained using labeled state data and geographic data with known future location(s) and/or trajectories of objects (e.g., as captured in a data log, manually, etc.). The model 136 can be trained based on, for example, a number of sets of data from previous events (e.g., previously obtained state data, previous obtained data associated with a geographic area). The training data can be associated with a previously observed trajectory of the object, which can allow the training data to train a model based on previously recorded real-world object motion and the data associated therewith.

The vehicle computing system 102 (e.g., the prediction system 126 of the autonomy system 114) can generate a specific data set to be used as an input into the model 136. For instance, the vehicle computing system 102 can obtain state data 130 associated with an object that is within the surrounding environment of the vehicle 104. The vehicle computing system 102 can also obtain data associated with a geographic area in which the object is located (e.g., map data 120, satellite imagery, sensor data 118, etc.). The vehicle computing system 102 (e.g., the prediction system 126) can generate a combined data set 137 associated with the object based at least in part on the state data 130 associated with the object (e.g., obtained via the perception system 124) and the data associated with the geographic area in which the object is located. For example, the vehicle computing system 102 can fuse the state data 130 associated with the object and the data associated with the geographic area in which the object is located, to generate the combined data set 137. The combined data set 137 can be indicative of the data associated with the geographic area projected onto the state data 130 (e.g., to a coordinate system associated with the object). Such fusion can provide a more accurate context of the object's current and/or past state(s) within the geographic area.

In some implementations, input data can include data associated with outputs from other tracking models. For example, in some implementations, the combined data set can include an estimated speed, heading, acceleration, and/or other characteristics of an object as determined by one or more models (e.g., object tracking models). These types of input data can also, or alternatively, be fused into the machine-learned model, as further described herein.

Figure 2A:
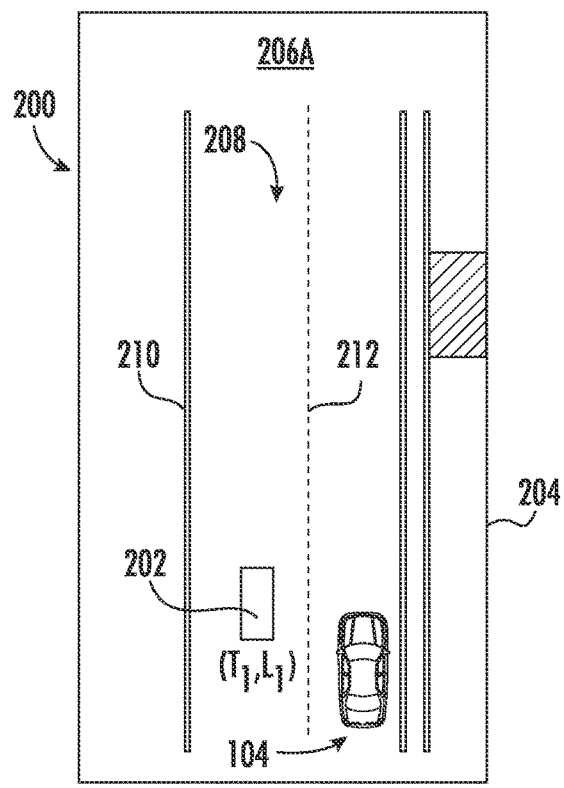
FIGS. 2A, 2B and 2C depict example data according to example embodiments of the present disclosure.
Figure 2B:
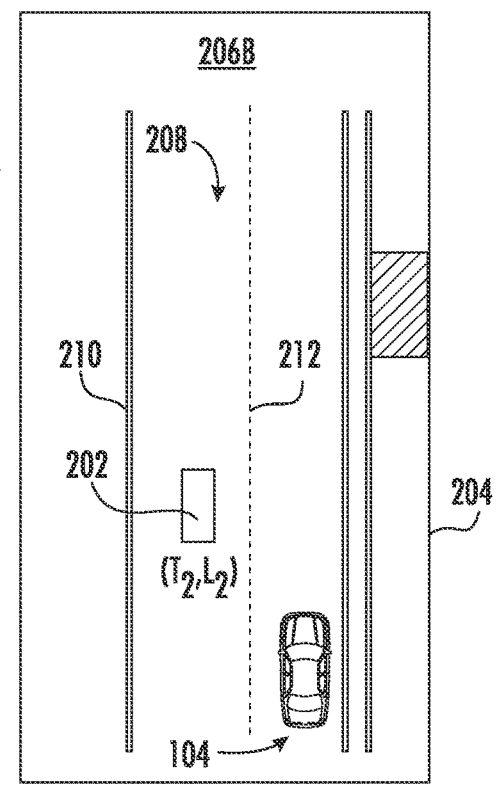
Figure 2C:
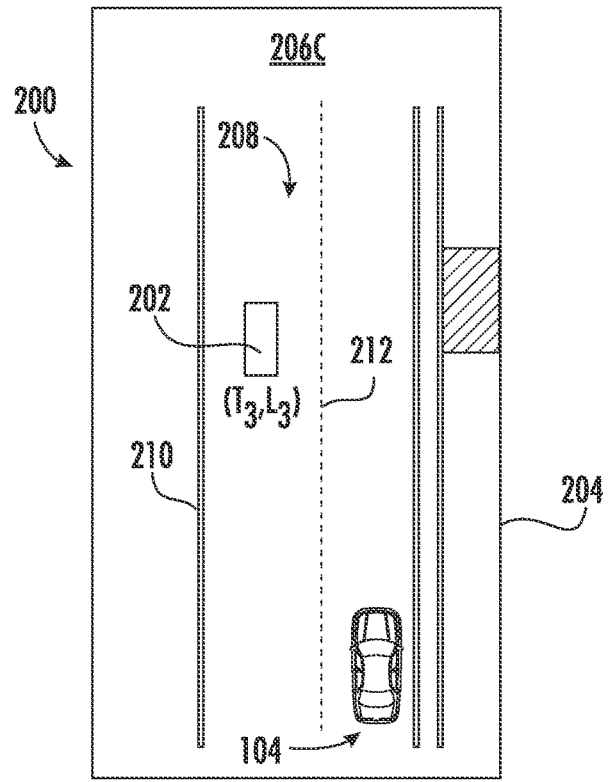

In some implementations, the combined data set 137 can include image data. For instance, FIGS. 2A-C shows example image data 200 according to example embodiments of the present disclosure. The vehicle computing system 102 can generate the image data 200 associated with an object 202 (e.g., another vehicle) based at least in part on a fusion of the state data 130 associated with the object 202 and the data associated with the geographic area 204 in which the object 202 is located. For example, to create the image data 200 the vehicle computing system 102 can convert the features of the state data 130 and the data associated with the geographic area 204 to image data (e.g., raster data) by using various processing and/or geoprocessing tools (e.g., ASCII, feature to raster, point to raster, etc.). In some implementations, the vehicle computing system may utilize interpolation techniques for the generation of the image data 200.

The vehicle computing system 102 can fuse these types of data to generate the image data 200 encoded with the state data 130, the data associated with the geographic area 204, and/or other features. For example, the combined data set 137 (e.g., the image data 200) can be encoded with features such as the object heading(s), object location(s), object orientation(s), travel way types (e.g., road, bike path, sidewalk, crosswalk, etc.), travel way headings, travel way boundaries, traffic light states (e.g., green, yellow, red, etc.), and/or other features. The features associated with the object 202 can be relative to the geographic area 204 such as, for example, object location(s) (e.g., vehicle locations, pedestrian locations) relative to a travel way boundary (e.g., lane boundary, sidewalk boundary).

In some implementations, the combined data set 137 (e.g., the image data 200) can include a plurality of images 206A-C based on the fusion of the state data 130 and the data associated with the geographic area 204. Each of the plurality of images can include the object 202, as shown for example in FIGS. 2A-C. Each image 206A-C can be, for example, a rasterized image where each pixel corresponds to a spatial area or volume (e.g., certain coordinates, etc.). In some implementations, an image 206A-C (e.g., rasterized image) can be a top-view image frame that includes the object 202 and a portion of the surrounding environment. The portion of the surrounding environment can be a portion of the surrounding environment (e.g., a portion of the geographic area 204) that is around the object 202 (e.g., within a certain distance threshold). This can allow the image 206A-C to reflect the past and/or current state of the object 202 within the most relevant portion of the surrounding environment relative to the object 202. As described herein, this can allow for more focused and efficient processing of the images 206A-C.

The overhead, bird's eye view images depicted in the figures are not intended to be limiting. The systems, methods, and models of the present disclosure can utilize input image data from other viewpoints as well as other sensor data. For example, the systems, methods, and models can utilize image data from a front-facing camera, other cameras, RADAR data, LIDAR data, and/or data from other sensors.

The image data 200 (e.g., the images 206A-C) can be encoded with one or more features, each encoded to a different channel of a plurality of channels of the image data 200 (e.g., of the respective images 206A-C). For example, each image 206A-C can include a plurality of pixels. The feature(s) for each particular spatial area or volume can be encoded in the corresponding pixel data via different channels (e.g., for each pixel). In some implementations, the image data 200 can include a plurality of color channels. Each of the color channels of the plurality of color channels can be encoded with a different feature. By way of example, the plurality of channels of a respective image 206A-C can include a plurality of color channels. Each color channel can be associated with a different color and each color channel can be encoded with a different feature. For example, a sidewalk can be represented by an orange color, while a roadway can be represented by a grey color. The combined data set 137 (e.g., the image data 200) can be indicative of the state of the object 202 within the geographic area 204 at a plurality of times. For example, as described herein the combined data set 137 can include a plurality of images 206A-C that include the object 202 (e.g., a plurality of rasterized images that include the object 202). The plurality of images 206A-C can be indicative of the state data 130 associated with the object 202 and the data associated with the geographic area 204 in which the object 202 is located at various times. By way of example, a first image 206A (shown in FIG. 2A) can be indicative of a first location (e.g., "$L_1$") of the object 202 at a first time (e.g., "$T_1$"). In some implementations, the first image 206A can indicate a heading of the object 202 at the first time. The first image 206A can be indicative of the first location of the object 202 and the heading of the object 202 (e.g., provided by the state data 130) within a relevant portion of the surrounding environment of the vehicle 102 (e.g., provided by the data associated with the geographic area 204). The image data 200 can focus on a portion of the surrounding environment that is relevant to the specific object 202 (e.g., a portion that is within a certain distance of the object, a portion that includes feature(s) which may affect the motion of the object 302, etc.). The fusion of these types of data can allow the first image 206A to indicate the state of the object 202 within the surrounding environment and, thus, relative to the features of the surrounding environment (e.g., the feature(s) of the geographic area 204), at the first time. For example, as shown in FIG. 2A, the first image 206A can indicate the location and heading of the object 202 relative to a travel way 208 (e.g., a roadway), one or more boundaries 210, 212 (e.g., lane boundaries), and/or other features of the geographic area 204 (e.g., that may be within a certain distance of the object, relevant to the object 202, etc.). A second image 206B (shown in FIG. 2B) can be indicative of a second location (e.g., "$L_2$") of the object 202 at a second time (e.g., "$T_2$"). In some implementations, the second image 206B can be indicative of a heading of the object 202 at the second time. The second image 206B can be indicative of the second location of the object 202 and the heading of the object 202 (e.g., provided by the state data 130) within a relevant portion of the surrounding environment of the vehicle 102 (e.g., provided by the data associated with the geographic area 204). The fusion of these types of data can allow the second image 206B to indicate the state of the object 202 within the surrounding environment and, thus, relative to the features the surrounding environment (e.g., of the geographic area 204) at the second time.

A third image 206C (shown in FIG. 2C) can be indicative of a third location (e.g., "$L_3$") of the object 202 at a third time (e.g., "$T_3$"). In some implementations, the third image 206C can indicate a heading of the object 202 at the third time. The third image 206C can be indicative of the third location of the object 202 and the heading of the object 202 (e.g., provided by the state data 130) within a relevant portion of the surrounding environment of the vehicle 102 (e.g., provided by the data associated with the geographic area 204). The fusion of these types of data can allow the third image 206C to indicate the state of the object 202 within the surrounding environment and, thus, relative to the features the surrounding environment (e.g., of the geographic area 204) at the third time.

Figure 3A:
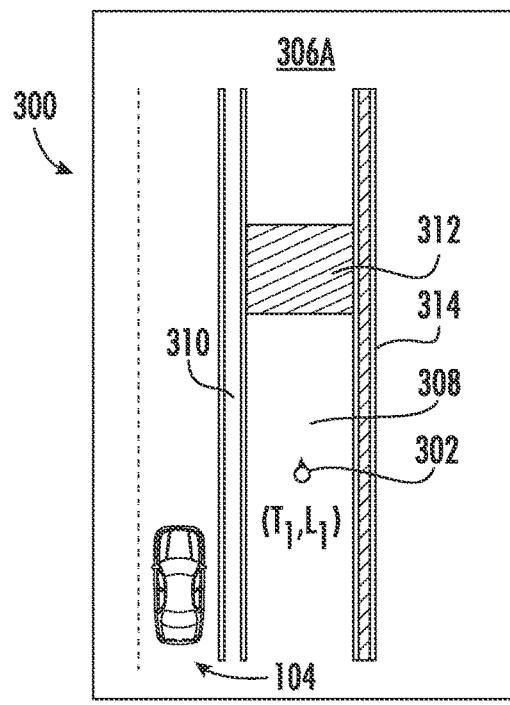
FIGS. 3A, 3B and 3C depict example data according to example embodiments of the present disclosure.
Figure 3B:
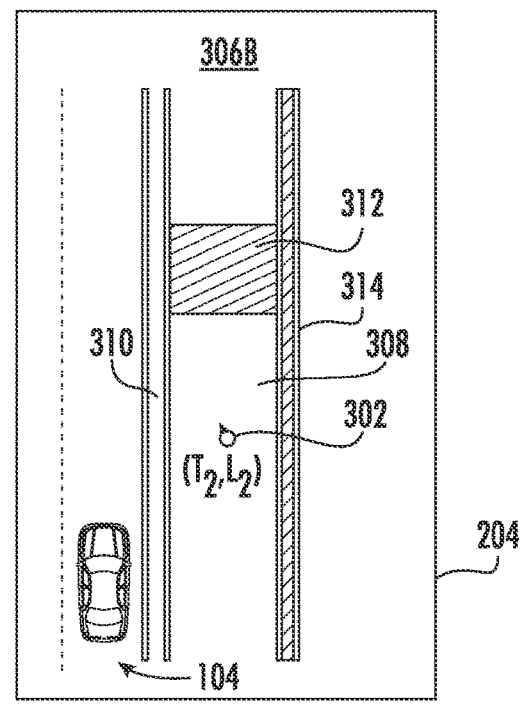
Figure 3C:
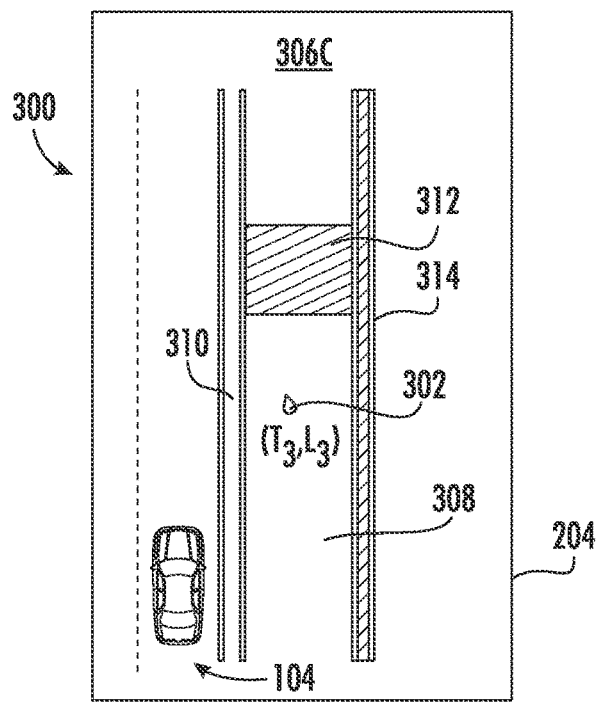

FIGS. 3A-C shows another set of example image data 300 according to example embodiments of the present disclosure. For instance, the vehicle computing system 102 can generate a combined data set 137 associated with the object 302 (e.g., a pedestrian) by fusing state data 130 associated with the object 302 with data associated with the geographic area 204 (e.g., map data 120, sensor data 118, satellite imagery, etc.). The combined data set 137 can include the image data 300 indicative of the state of the object 302 within the geographic area 204. In some implementations, the image data 300 can include a plurality of images 306A-C (e.g., rasterized images) that include the object 302, as shown in FIGS. 3A-C. The images 306A-C can be indicative of the state of the object 302 within a relevant portion of the surrounding environment of the vehicle 104 (e.g., within the portion of the geographic area that is around the object 302) at various times.

For example, a first image 306A (shown in FIG. 3A) can be indicative of a first location (e.g., "$L_1$") of the object 302 (e.g., a pedestrian) at a first time (e.g., "$T_1$"). In some implementations, the first image 306A can indicate a heading of the object 302 at the first time. The first image 306A can be indicative of the first location of the object 302 and the heading of the object 302 (e.g., provided by the state data 130) within a relevant portion of the surrounding environment of the vehicle 102 (e.g., provided by the data associated with the geographic area 204). The image data 300 can focus on a portion of the surrounding environment that is relevant to the specific object 302 (e.g., within a certain distance of the object 302, that includes feature(s) which may affect the motion of the object 302, etc.). For example, the portion of the surrounding environment that is relevant to the object 302 can be at least partially different than the portion of the surrounding environment that is relevant to a different object, such as the object 202. The fusion of the state data 130 associated with object 302 and the data associated with the geographic area 204 can allow the first image 306A to indicate the state of the object 302 within the surrounding environment and, thus, relative to the features the surrounding environment (e.g., relative to one or more features of the geographic area 204) at the third time. For example, as shown in FIG. 3A, the first image 306A can indicate the location and heading of the object 302 relative to a sidewalk 308, a bike path 310, an obstruction 312 (e.g., sidewalk construction/repair), a wall 314, and/or other features of the geographic area 204 (e.g., that may be relevant to the object 302). A second image 306B (shown in FIG. 3B) can be indicative of a second location (e.g., "$L_2$") of the object 302 at a second time (e.g., "$T_2$"). In some implementations, the second image 306B can indicate a heading of the object 302 at the second time. The second image 306B can be indicative of the second location of the object 302 and the heading of the object 302 (e.g., provided by the state data 130) within a relevant portion of the surrounding environment of the vehicle 102. The fusion of these types of data can allow the second image 306B to indicate the state of the object 302 within the surrounding environment and, thus, relative to the features the surrounding environment (e.g., of the geographic area 204) at the second time.

A third image 306C (shown in FIG. 3C) can be indicative of a third location (e.g., "$L_3$") of the object 302 at a third time (e.g., "$T_3$"). In some implementations, the third image 306C can indicate a heading of the object 302 at the third time. The third image 306C can be indicative of the third location of the object 302 and the heading of the object 302 (e.g., provided by the state data 130) within a relevant portion of the surrounding environment of the vehicle 104. The fusion of these types of data can allow the third image 306C to indicate the state of the object 302 within the surrounding environment and, thus, relative to the features the surrounding environment (e.g., of the geographic area 204) at the third time. The vehicle computing system 102 can be utilize a model 136 (e.g., machine-learned model) to evaluate the combined data set 137 (e.g., image data 200, 300). For instance, FIG. 4 depicts an example implementation 400 of a model according to example embodiments of the present disclosure. The vehicle computing system 102 (e.g., the perception system 124 of the autonomy system 114) can obtain data indicative of a model 136 (e.g., machine-learned model) from an accessible memory located onboard the vehicle 104. The vehicle computing system 102 can provide input data 402 to the model 136. The input data 402 can include the combined data set 137 generated based on a fusion of the state data 130 associated with an object 202, 302 and the data associated with the geographic area 204 in which the object 202, 302 is located. In some implementations, the input data 402 can include the image data 200, 300 (e.g., the plurality of images 206A-C, 306A-C) associated with the object 202, 302. Thus, the vehicle computing system 102 can input the combined data set 137 (e.g., the image data 200, 300; the plurality of images 206A-C, 306A-C) associated with the object 202, 302 into the model 136.

In some implementations, the machine-learned model 136 can be configured to receive one or more features of the combined data set 137 (e.g., the plurality of rasterized images) via one or more separate channel(s). As described herein, the image data 200, 300 can include a plurality of channels (e.g., color channels). Each of the channels (e.g., color channels) of the plurality of channels (e.g., color channels) can be encoded with a different feature of the image data 200, 300. The model 136 (e.g., machine-learned model) can be configured to receive each different feature via the plurality of channels (e.g., color channels). For example, the model 136 can include a convolutional neural network configured to receive one or more features of a plurality images 206A-C that include the object (e.g., rasterized images that include the object 202). The one or more features can be associated with a plurality of color channels of the plurality of images 206A-C (e.g., rasterized images). In some implementations, the input data 402 (e.g., via the channels) can feed into the initial layer of a multi-layer machine-learned model. Additionally, or alternatively, the input data 402 (e.g., via the channels) can feed into an intermediate layer. In some implementations, the model 136 can be configured to receive input data 402 via plurality of channel sets 404A-B. A first channel set 404A can be associated with a first point in time and a second channel set 404B can be associated with a second point in time. By way of example, the first channel set 404A can be associated with the channels of a first image 206A that includes the state of an object 202 within the geographic area 204, at a first point in time (e.g., "T$_1$"). Each channel of the first channel set 404A can be associated with a different feature (e.g., of the image) at the first point in time. The second channel set 404B can be associated with the channels of a second image 206B that includes the state of the object 202 within the surrounding environment, at a second point in time (e.g., "T$_2$"). Each channel of the second channel set 404B can be associated with a different feature (e.g., of the image) at the first point in time. In this way, the model 136 can be configured to receive input data 402 that is indicative of the state of the object at various times, via a plurality of channel sets.

The vehicle computing system 102 can be configured to determine a predicted trajectory of an object 202, 302 based at least in part on the combined data set 137 (e.g., the image data 200, 300 associated with the object 202, 302; the plurality of images 206A-C, 306A-C that include the object 202, 302) and a model 136. A predicted trajectory can include a plurality of predicted future locations of an object at one or a plurality of future times. The predicted trajectory can be indicative of a predicted motion of the object. For instance, the vehicle computing system 102 can provide the input data 402 (e.g., the combined data set 137) into the model 136. The model 136 can be configured to determine a predicted trajectory of an object based at least in part on the state of the object relative to the features of the surrounding environment (e.g., of the geographic area 204). The vehicle computing system 102 (e.g., the prediction system 126, the motion planning system 128) can receive an output 406 from the model 136. The output 406 can be indicative of a predicted trajectory of the object. In some implementations, the output 406 can include a single predicted future location of the object. In some implementations, the output 406 can include a predicted velocity of the object.

The model 136 can determine a predicted trajectory of the objects 202 and 302 based at least in part on the features extracted from the combined data set 137 associated with that respective object (e.g., the image data 200, 300). For instance, the model 136 can include a convolution neural network configured convolve over the combined data set 137 (e.g., the plurality of rasterized images) to determine the predicted trajectory of an object 202, 302 based on the information encoded in the combined data set 137. The model 136 can analyze the combined data set 137 to predict a path of the object based on the locations, headings, velocities, etc. indicated in the state data 130 and further refine that prediction with the data associated with the geographic area 204 (e.g., map data 120).

By way of example, to determine a predicted trajectory of the object 202 (e.g., a vehicle), the model 136 can analyze the images 206A-C. As described herein, each image 206A-C associated with the object 202 can be associated with a different point in time. As such, the model 136 can evaluate the state(s) of the object 202 within the geographic area 204 as a progression of time. As described herein, the combined data set 137 (e.g., image data 200) can be specific to the particular object 202, rather than the entire surrounding environment of the vehicle 104. For example, each image 206A-C can be indicative of a snapshot of the object 202 and the area immediately around the object (e.g., 25, 50, 100 m, etc.), rather than the entire surrounding environment of the vehicle 104. Thus, the model 136 can predict the motion of the object 202 relative to a relevant portion of the surrounding environment (e.g., relative to the relevant feature(s) of the geographic area 204). Accordingly, the model 136 can predict that the object 202 is more likely to travel within the boundaries 210, 212 of the travel way 208 given its states and surrounding environment. The output 406 of the model 136 can be indicative of the predicted trajectory of the object 202.

Figure 5:
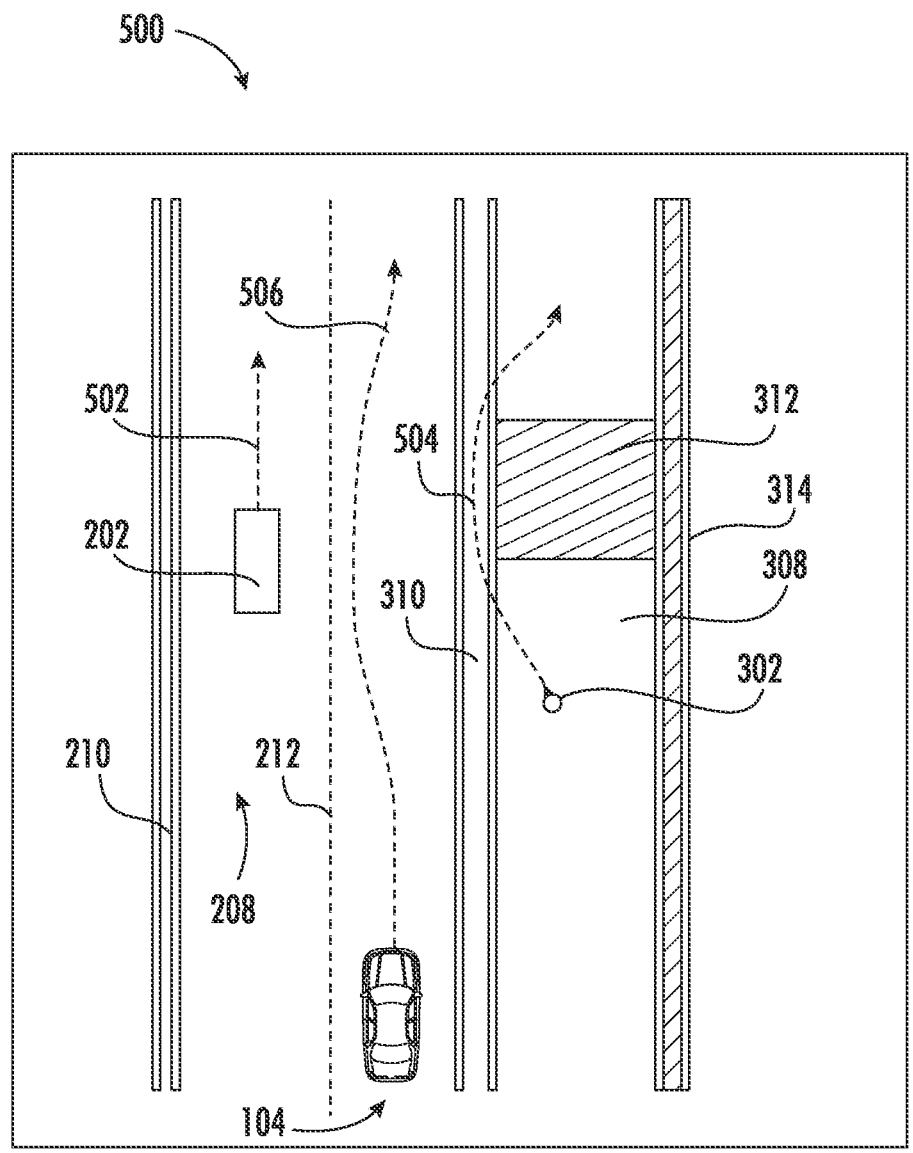
FIG. 5 depicts a diagram of various types of data according to example embodiments of the present disclosure.

The model 136 can analyze the plurality of images 306A-C to determine a predicted trajectory of the object 302 (e.g., a pedestrian) within the surrounding environment of the vehicle 104 (e.g., a portion of the surrounding environment relevant to the pedestrian). For example, the model 136 can evaluate the images 306A-C to determine that there is an obstruction 312 blocking a portion of the sidewalk 308 (e.g., due to construction/repair). The model 136 can determine that the object 302 (e.g., pedestrian) is likely to travel around the obstruction 312 by traveling within an adjacent bike lane 310, given that a wall 314 is positioned on the other side of the sidewalk 308. The model 136 can also predict that the object 302 is to return to the sidewalk after the passing the obstruction 312. The output 406 of the model 136 can be indicative of the predicted trajectory of the object 302. FIG. 5 depicts a diagram 500 of an example output 406 of the model 136 according to example embodiments of the present disclosure. As shown, the output 406 can be indicative of a predicted trajectory 502 (e.g., a plurality of future locations) of the object 202. The predicted trajectory 502 can be relative to one or more features of the geographic area 204 (e.g., one or more features shown in the images 206A-C). By way of example, the output 406 can indicate that the object 202 (e.g., a vehicle) is predicted to travel within the travel boundaries 210 and 212 of travel way 208. Additionally, or alternatively, the output 406 can be indicative of a predicted trajectory 504 (e.g., a plurality of future locations) of the object 302. The predicted trajectory 504 can be relative to one or more features of the geographic area 204 (e.g., one or more features shown in the images 306A-C). By way of example, the output 406 can indicate that the object 302 (e.g., a pedestrian) is predicted to travel along the sidewalk 308, within the bike lane 310, and/or return to the sidewalk 308 (avoiding the obstruction 312). In some implementations, the output 406 can also, or alternatively, indicate a predicted heading, speed, and/or bounding shape associated with an object 202, 302.

Returning to FIG. 4, the vehicle computing system 102 can plan a motion of the vehicle 104 based at least in part on the predicted trajectory 502, 504 of an object 202, 302. For example, the motion planning system 128 can generate a motion plan 134 for the vehicle 104. A motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. The motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104. The prediction system 126 can provide the output 406 (and/or other data indicative of the predicted trajectory 502, 504 of an object 202, 302) to the motion planning system 128 of the vehicle 104. The motion planning system 128 can generate a motion plan 134 for the vehicle 104 based at least in part on the output 406 (and/or other data indicative of the predicted trajectory 502, 504 of an object 202, 302).

For instance, given the predicted trajectories 502, 504 of objects 202, 302, the motion planning system 128 can determine a motion plan 134 for the vehicle 104 that best navigates the vehicle 104 relative to the objects 202, 302 at their future locations. By way of example, the motion planning system 128 can determine that the object 202 is likely to remain within the travel way 208, adjacent to the vehicle 104, based at least in part on the output 406 (and/or other data indicative of the predicted trajectory 502 of the object 202). Moreover, the motion planning system 128 can determine that the object 302 (e.g., a pedestrian) will travel within a bike lane 310 adjacent to the vehicle's travel way (e.g., to bypass an obstruction 312 in a sidewalk 308). Accordingly, the motion planning system 128 can generate a motion plan 134 that includes one or more vehicle trajectories that would cause the vehicle 104 to nudge away from the object 302 (e.g., move within the vehicle's travel way) in order to increase the distance between the vehicle 104 and the predicted trajectory 504 of the object 302, as the vehicle passes the object 302. The one or more vehicle trajectories can also be generated such that the vehicle will avoid a movement into the travel way 208 (e.g., a lane change), which would encroach on the predicted trajectory of the object 202. This is shown, for example, in FIG. 5 as the one or more planned vehicle trajectories 506. This is shown for explanatory purposes only, such data may not be indicated by the output 406 of the model 136.

The vehicle computing system 102 can control the motion of the vehicle 104 based at least in part on the output 406 from the model 136. For example, the motion planning system 128 can provide the motion plan 134 with data indicative of the vehicle actions, a planned trajectory, and/or other operating parameters to the vehicle control system(s) 116 (shown in FIG. 1) to implement the motion plan 134 for the vehicle 104. The vehicle control system(s) 116 can include a vehicle controller configured to translate the motion plan 134 into instructions. The vehicle controller can translate the motion plan 134 into instructions for the appropriate vehicle controls (e.g., acceleration control, brake control, steering control, etc.). By way of example, the vehicle controller can translate the determined motion plan 134 into instructions to adjust the steering of the vehicle 104 "X" degrees, apply a certain magnitude of braking force, etc. in order to cause the vehicle 104 to travel according to the one or more planned vehicle trajectories 506. The mobility controller can send one or more control signals to the responsible vehicle control component (e.g., braking control system, steering control system, acceleration control system) to execute the instructions and implement the motion plan 134.

In some implementations, the model 136 can output a plurality of predicted trajectories. For instance, the model 136 can be trained to employ a multi-modal functionality by which the model determines a plurality of potential trajectories for an object. To do so, as described herein, the vehicle computing system 102 can obtain state data 130 indicative of at least a current or a past state of an object that is within a surrounding environment of the vehicle 104 and data associated with a geographic area in which the object is located (e.g., map data 120, sensor data 118, satellite image data, etc.). The vehicle computing system 102 (e.g., the prediction system 126) can generate a combined data set 137 associated with the object based at least in part on the state data 130 associated with the object and the data associated with the geographic area in which the object is located (e.g., based at least in part on a fusion of these types of data), as described herein. The vehicle computing system 102 can obtain data indicative of a model 136 (e.g., machine-learned model) from, for example, an accessible memory. The vehicle computing system 102 can provide input data 402 to the model 136. The input data 402 can include the combined data set 137 generated based on the fusion of the state data 130 associated with the object and the data associated with the geographic area in which the object is located. In some implementations, the input data 402 can include the image data. For example, the image data can include one or more images (e.g., rasterized images), as described herein.

The vehicle computing system 102 can determine a plurality of predicted trajectories of the object based at least in part on the combined data set 137 (e.g., the image data associated with the object) and the model 136 (e.g., the machine-learned model). For instance, as described herein, the input data 402 can include one or more rasterized images that include the object. The vehicle computing system 102 can input the one or more rasterized images into the model 136. The model 136 can be configured to determine the plurality of predicted trajectories of the object based at least in part on the one or more rasterized images. For example, as described herein, a rasterized image can be encoded with one or more features and each of the one or more features can be encoded to a different channel of a plurality of channels. By way of example, the image data 200, 300 can include a plurality of color channels and each of the color channels of the plurality of color channels can be encoded with a different feature. The model 136 can be configured to receive the one or more features via the plurality of channels and perform its analysis accordingly. For instance, the model 136 can include a convolution neural network configured convolve over the combined data set (e.g., one or more rasterized images) to determine the plurality of predicted trajectories of the object based on the information encoded in the input data 402. As described herein, the model 136 can analyze the combined data set 137 to predict the trajectories of an object based on the locations, headings, velocities, etc. indicated in the state data 130 and further refine that prediction with the data associated with the geographic area (e.g., map data).

In some implementations, the model 136 can be configured to perform a goal-based prediction. Such an approach can allow the model 136 to consider a "goal" that an object may aim to accomplish. For instance, an object can be associated with one or more nominal pathways. As an example, in some instances, nominal pathway(s) can generally correspond to common patterns of object travel (e.g., vehicles travelling within lanes on a roadway or other travel way, bicycles traveling in a bike lane, pedestrians travelling within the boundaries of a walkway, etc.). As one example, a nominal pathway can generally describe a path by which a vehicle may: continue according to its current lane; merge from its current lane into an adjacent lane; turn from the current lane into an adjacent road portion; or other pathways that correspond to other driving actions. By way of example, an object (e.g., a vehicle) approaching an intersection can be associated with one or more nominal pathways. A first nominal pathway of the object can include a first pathway that corresponds to a right-hand turn at the intersection, a second nominal pathway of the object can include a second pathway that corresponds to a left-hand turn at the intersection, and a third nominal pathway of the object can include a third pathway that corresponds to traveling straight through the intersection. The nominal pathway(s) can be based on real-world observations of the type of pathways taken by a particular type of object within a geographic area (or similar geographic area).

The vehicle computing system 102 can obtain data indicative of one or more nominal pathways for the object (e.g., from an accessible memory onboard or remote from the vehicle). The combined data set 137 associated with the object can be generated based at least in part on the one or more nominal pathways for the object. For instance, the nominal pathway(s) can be encoded as feature(s) in a channel of the combined data set 137 (e.g., a color channel of the image data 200, 300). In this way, the model 136 can consider the nominal pathway(s) of an object when determining the plurality of predicted trajectories for an object.

Figure 8:
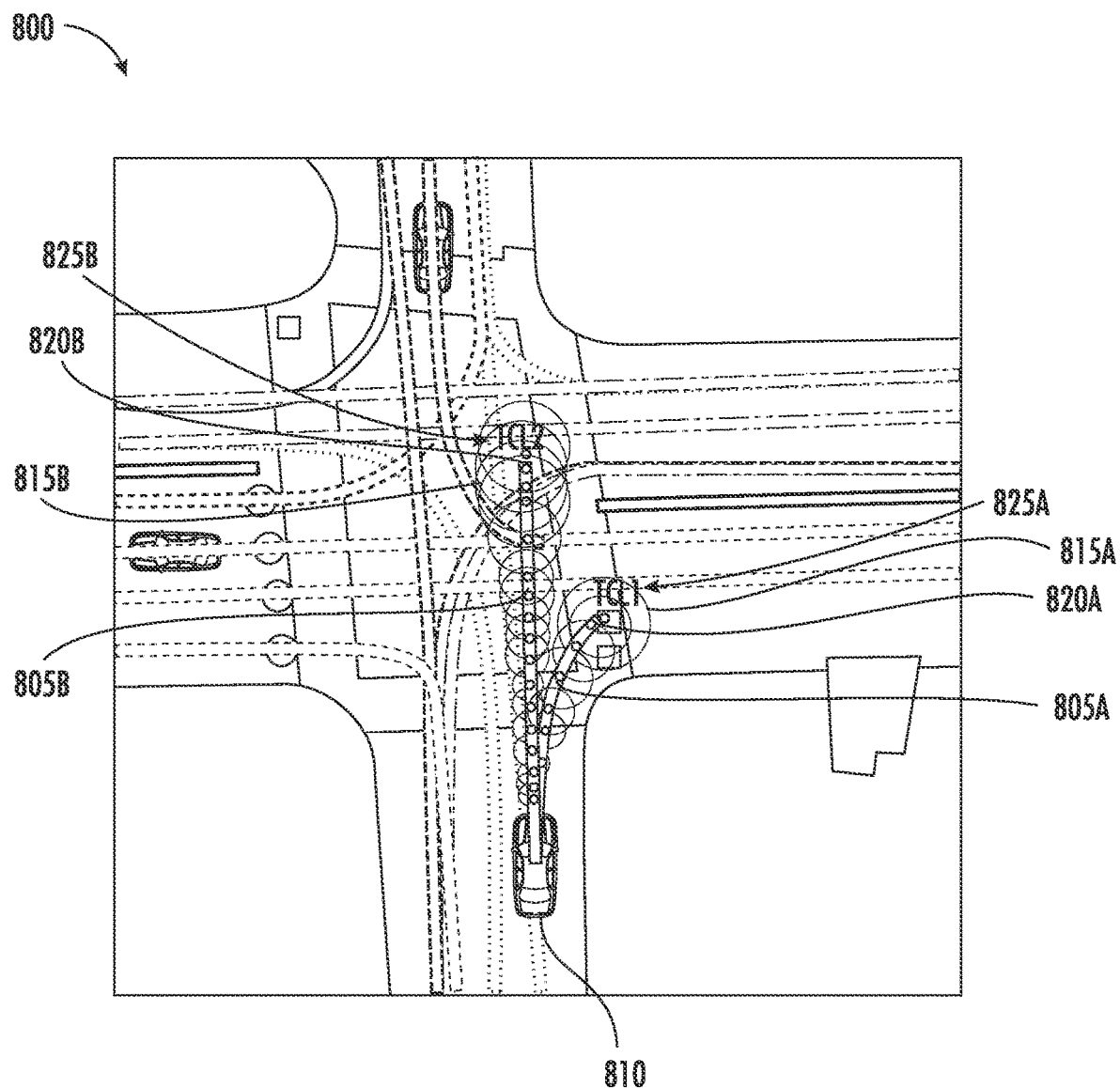
FIG. 8 depicts an example output of a machine-learned model according to example embodiments of the present disclosure.

The vehicle computing system 102 can receive an output from the model 136 that is indicative of the plurality of predicted trajectories of an object. For instance, FIG. 8 depicts an example output 800 of the model 136 according to example aspects of the present disclosure. The output 800 includes a plurality of predicted trajectories 805A-B for an object 810. As shown, each of the predicted trajectories 805A-B can include a plurality of way-points. Each way-point can be indicative of a predicted future location of the object 810 (e.g., an x-y position, etc.).

The model 136 can be trained to determine the plurality of predicted trajectories 805A-B for the object 810 based at least in part on a combined data set 137 associated with the object 810. For instance, the model 136 can process the combined data set 137 (e.g., the fused state data) to determine that the object 810 (e.g., a vehicle) is travelling at a certain speed, in the direction of the intersection shown in FIG. 8, etc. The model 136 can also process the combined data set 137 (e.g., the fused map data) to determine that the object 810 is traveling within a particular travel lane as it approaches the intersection, the color of the traffic light, etc. In some implementations, the model 136 can process the nominal pathway information to determine which nominal pathway(s) the object 810 may be likely to take (e.g., based on previously observed actions for that type of vehicle). Based on the combined data set 137, the model 136 can determine that the object 810 is travelling within the right-hand travel lane of the travel way as the object 810 approaches the intersection. The model 136 can determine that, from this travel lane, the object 810 is permitted to make a right-hand turn at the intersection or go straight through the intersection. To further refine this determination, the model 136 can also determine that based on the nominal pathways for a vehicle travelling in this (or a similar type) of travel lane, the object 810 may be likely to take a right-hand turn or travel straight through the intersection.

The model 136 can determine a way-point confidence level for each way-point within a predicted trajectory. Stated differently, each predicted way-point can be associated with a respective way-point confidence level. A way-point confidence level can be indicative of the per-way-point uncertainty for the way-point (e.g., predicted future location) within a predicted trajectory. This can help quantify the confidence in how exactly the object is going to follow a certain trajectory.

The model 136 can be trained to determine the way-point confidence level of a way-point. For instance, an assumption can be made that each way-point can be sampled from a 2D-Gaussian distribution, where the Gaussian distribution is parametrized by 2D mean (e.g., x-y positions) and 2×2 covariance matrix (e.g., modeling uncertainty). The negative log-likelihood of the training data set can be minimized, with the potential assumption that all waypoints are independently sampled. For instance, assuming a set T of training trajectories, and assuming w.l.o.g. that all trajectories are of length N, the loss can be written as follows:

$$L = -\sum_{t \in T} \sum_{i=1}^{N} \log P([x_{ti}, y_{ti}] \mid \hat{\mu}_{ti} = [\hat{x}_{ti}, \hat{y}_{ti}], \hat{\Sigma}_{ti}),$$

Mean ($\hat{\mu}_{ti}$) and covariance matrix ($\hat{\Sigma}_{ti}$) can be outputted by the model 136. Thus, for a single trajectory of length N, the model output can be a vector of length (2N+3N), where 2N accounts for x- and y-dimensions of each waypoint, and 3N accounts for variance along x-/y-dimensions as well as their covariance. The assumption of Gaussian distribution can allow for a derivation of equations for the loss.

The output 800 from the model 136 (e.g., machine-learned model) can be further indicative of the respective way-point confidence levels associated with the way-points. For instance, the model 136 can output a way-point confidence level for each way-point of the first predicted trajectory 805A and each way-point of the second predicted trajectory 805B. By way of example, as shown in FIG. 8, the model 136 can determine and output a first way-point confidence level 815A for a first way-point 820A of the first predicted trajectory 805A. The first way-point confidence level 815A can be represented by a circle centered on the first way-point 820A, where the radius of the circle is indicative of the confidence (e.g., the smaller the circle's radius the higher the confidence and the larger the circle's radius the lower the confidence, the larger the circle's radius the higher the uncertainty and the smaller the circle's radius the lower the uncertainty). The variation in confidence level can arise from the real-world observation that objects can operate with at least some degree of variation (e.g., various driving styles, various biking styles, various walking speeds, etc.). Additionally, or alternatively, the model 136 can determine and output a second way-point confidence level 815B for a second way-point 820B of the second predicted trajectory 805B. The second way-point confidence level 815B can be represented by a circle centered on the second way-point 820B, where the radius of the circle is indicative of the confidence/uncertainty associated with that particular predicted future location of the object. Additionally, or alternatively, the model 136 can determine a trajectory confidence level for each predicted trajectory. A trajectory confidence level can indicate a per-trajectory probability, quantifying how likely an object is to follow a certain trajectory (e.g., the sum of per-trajectory probabilities over all outputted trajectories can equal 1). In addition to 5N outputs for a single trajectory, one additional output can be used to estimate the per-trajectory probability (resulting in 5N+1 output for a trajectory). For example, assuming there are M output modes (a single mode is defined as a single trajectory), the total number of outputs is M(5N+1).

The model 136 can be trained to determine a trajectory confidence level (e.g., a per-trajectory probability) by minimizing cross-entropy loss over all per-trajectory probabilities. The training label utilized for the trajectory can be computed on the fly, by comparing losses of all trajectory modes for a training example and labeling the one that has the lowest error as 1 and all others as 0 (e.g., with a single trajectory labeled as 1). When there are multiple modes, the total loss includes two parts:

$$L = L_{traj} + L_{cls}$$

where $L_{traj}$ is the trajectory loss (calculated using the formula above) taken from the most accurate mode and $L_{cls}$ is the classification loss that quantifies the accuracy of the per-trajectory probability. Assuming that the loss for mode m is $L_{traj,m}$ and that the most accurate mode among the M modes is m*. The trajectory loss term can be:

$$L_{traj} = L_{traj,m^*}$$

Assuming the predicted probability for the M modes are $\widehat{c_i}$, and that the probability label (computed on the fly during training with m* being 1 and all others being 0) is c. The classification loss can be computed as shown below (where H is the cross-entropy function):

$$L_{cls} = H(c, \widehat{c_i})$$

Additionally, or alternatively, the previously described loss function (e.g., with mean $\mu_{t_i}$ and covariance matrix $\hat{\Sigma}_{t_i}$) can be optimized, resulting in a Gaussian Mixture Model or Mixture Density Network. There are other loss functions that can be optimized to train the network to output plurality of trajectories The output 800 from the model 136 (e.g., machine-learned model) can be further indicative of a trajectory confidence level for each respective predicted trajectory. For instance, the model 136 can determine and output a first trajectory confidence level 825A ("TCL1") associated with the first predicted trajectory 805A and a second trajectory confidence level 825B ("TCL2") associated with the second predicted trajectory 805B. The model 136 can be trained to determine these confidence levels based at least in part on the combined data set 137. For instance, in the event that it is determined that the object 810 is travelling in a right travel lane and is not decelerating as the object approaches the intersection (based on the map/state data), there may be a higher level of confidence that the object 810 will travel straight through the intersection. Accordingly, the second trajectory confidence level 825B (associated with the second predicted trajectory 805B that goes straight through the intersection) may be higher than the first trajectory confidence level 825A associated with the first predicted trajectory 805A (which is indicative of a right-hand turn at the intersection).

The vehicle computing system 102 can receive the output 800 (e.g., as output data 406) that indicatives the plurality of predicted trajectories 805A-B for the object 810 as well as the way-point and/or trajectory confidence levels. The vehicle computing system 102 can determine a selected predicted trajectory of the object 810 from among the plurality of predicted trajectories 805A-B of the object 810. For instance, the model 136 can be trained to select one of the trajectories (e.g., as a "winner"). This can include training the model 136 to evaluate which trajectory of a set of trajectories is closest to a ground truth. Closeness can be measured by the average displacement error (L2) of the waypoints to the ground truth, checking the azimuth angle, and/or other approaches. In some implementations, a predicted trajectory can be selected based at least in part on one or more of the trajectory confidence levels and/or the way-point confidence levels. By way of example, the second predicted trajectory 805B can be selected for the object 810.

Figure 6:
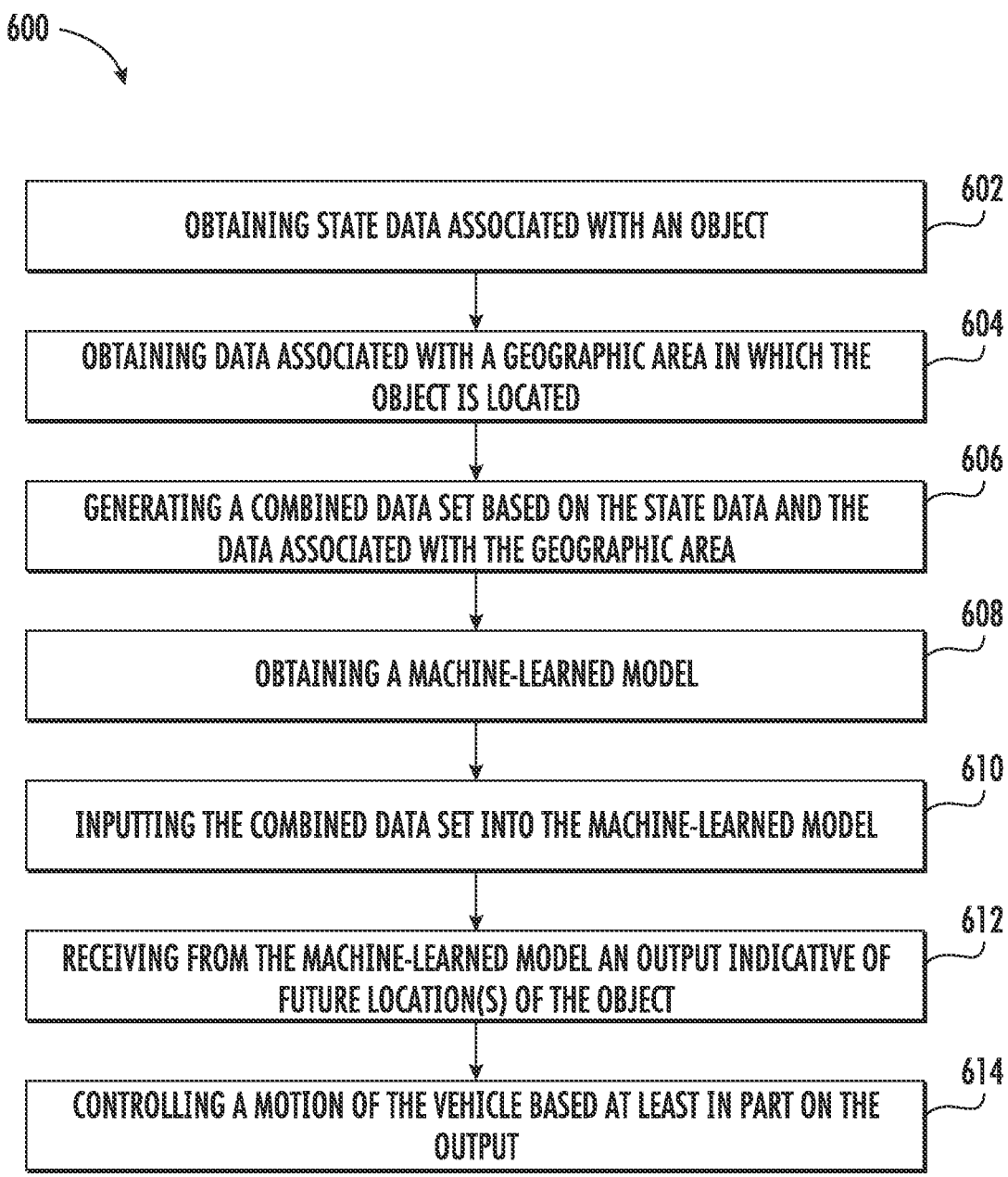
FIG. 6 depicts a flow diagram of an example method of predicting object motion and controlling autonomous vehicles according to example embodiments of the present disclosure.

FIG. 6 depicts a flow diagram of an example method 600 of predicting object motion and controlling autonomous vehicles according to example embodiments of the present disclosure. One or more portion(s) of the method 600 can be implemented by one or more computing devices such as, for example, the one or more computing device(s) of the vehicle computing system 102 and/or other systems. Each respective portion of the method 600 can be performed by any (or any combination) of the one or more computing devices. Moreover, one or more portion(s) of the method 600 can be implemented as an algorithm on the hardware components of the device(s) described herein (e.g., as in FIGS. 1 and 7), for example, to predict object motion and control an autonomous vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include obtaining state data associated with an object. For instance, the vehicle computing system 102 can obtain state data 130 indicative of at least a current or past state of an object that is within a surrounding environment of a vehicle 104. For example, the vehicle computing system 102 can obtain state data 130 associated with an object 302 (e.g., a pedestrian) within the surrounding environment of the vehicle 104. The state data 130 associated with the object 302 can include the heading, location, speed, and/or other information associated with the object 302, at one or more times. At (604), the method 600 can include obtaining data associated with a geographic area in which the object is located. For example, the vehicle computing system 102 can obtain data associated with a geographic area 204 in which the object 302 is located. The data associated with the geographic area 204 in which the object 302 is located can include at least one of map data 120 associated with the geographic area 204, sensor data 118 associated with the geographic area 204 (e.g., sensor data 118 acquired within the geographic area 204 and/or otherwise indicative of feature(s) of the geographic area 204), or satellite image data associated with the geographic area 204 (e.g., overhead aerial imagery).

At (606), the method 600 can include generating a combined data set 137 based at least in part on the state data and the data associated with the geographic area. For example, the vehicle computing system 102 can generate a combined data set 137 associated with the object 302 based at least in part on a fusion of the state data 130 and the data associated with the geographic area 204 in which the object 302 is located. The vehicle computing system 102 can generate image data 300 based at least in part on the fusion of the state data 130 and the data associated with the geographic area 204 in which the object 302 is located. The state data 130 and the data associated with the geographic area 204 in which the object 302 is located can be encoded within the image data 300. For example, the image data 300 can include a plurality of images 306A-C (e.g., a plurality of rasterized images) that include the object 302. Each of the plurality of images 306A-C (e.g., rasterized images) can be encoded with one or more features. Each of the one or more features can be encoded to a different channel of a plurality of channels (e.g., of the images 306A-C).

At (608), the method 600 can include obtaining a machine-learned model. For instance, the vehicle computing system 102 can obtain data indicative of a model 136. The model 136 can be a machine-learned model such as, for example, a machine-learned model that includes a deep neural network, a convolutional neural network, and/or other types of machine-learned models.

At (610), the method 600 can include inputting the combined data set 137 into the machine-learned model. For instance, the vehicle computing system 102 can input the combined data set 137 into the model 136 (e.g., the machine-learned model). By way of example, the vehicle computing system 102 can input the image data 300 into the model 136 (e.g., the machine-learned model). The model 136 (e.g., the machine-learned model) can be configured to determine the predicted trajectory 504 of the object 302 based at least in part on the image data 300. In some implementations, the vehicle computing system 102 can input a plurality of images 306A-C (e.g., a plurality of rasterized images) into the model 136 (e.g., the machine-learned model). The model 136 can be configured to determine the predicted trajectory 504 of the object 302 based at least in part on the plurality of images 306A-C (e.g., rasterized images). In some implementations, the model 136 can be configured to receive one or more features (e.g., encoded within the images 306A-C) via a plurality of channels, as described herein.

At (612), the method 600 can include receiving from the machine-learned model an output indicative of one or more future location(s) of the object. The vehicle computing system 102 can receive an output 406 from the model 136 (e.g., machine-learned model). The output 406 can be indicative of, for example, a predicted trajectory 504 of the object 302. The predicted trajectory 504 of the object 304 can include a plurality of predicted future locations of the object 302 over time (e.g., at future times). In some implementations, the output 406 can include a predicted velocity of the object 302.

At (614), the method 600 can include controlling a motion of the vehicle based at least in part on the output. For instance, the vehicle computing system 102 can control a motion of the vehicle 104 based at least in part on the output 406 from the model 136 (e.g., the machine-learned model). The vehicle computing system 102 can generate a motion plan 134 for the vehicle 104 based at least in part on the output 406, as described herein. The vehicle computing system 102 can cause the vehicle 104 to travel in accordance with the motion plan 134.

Figure 9:
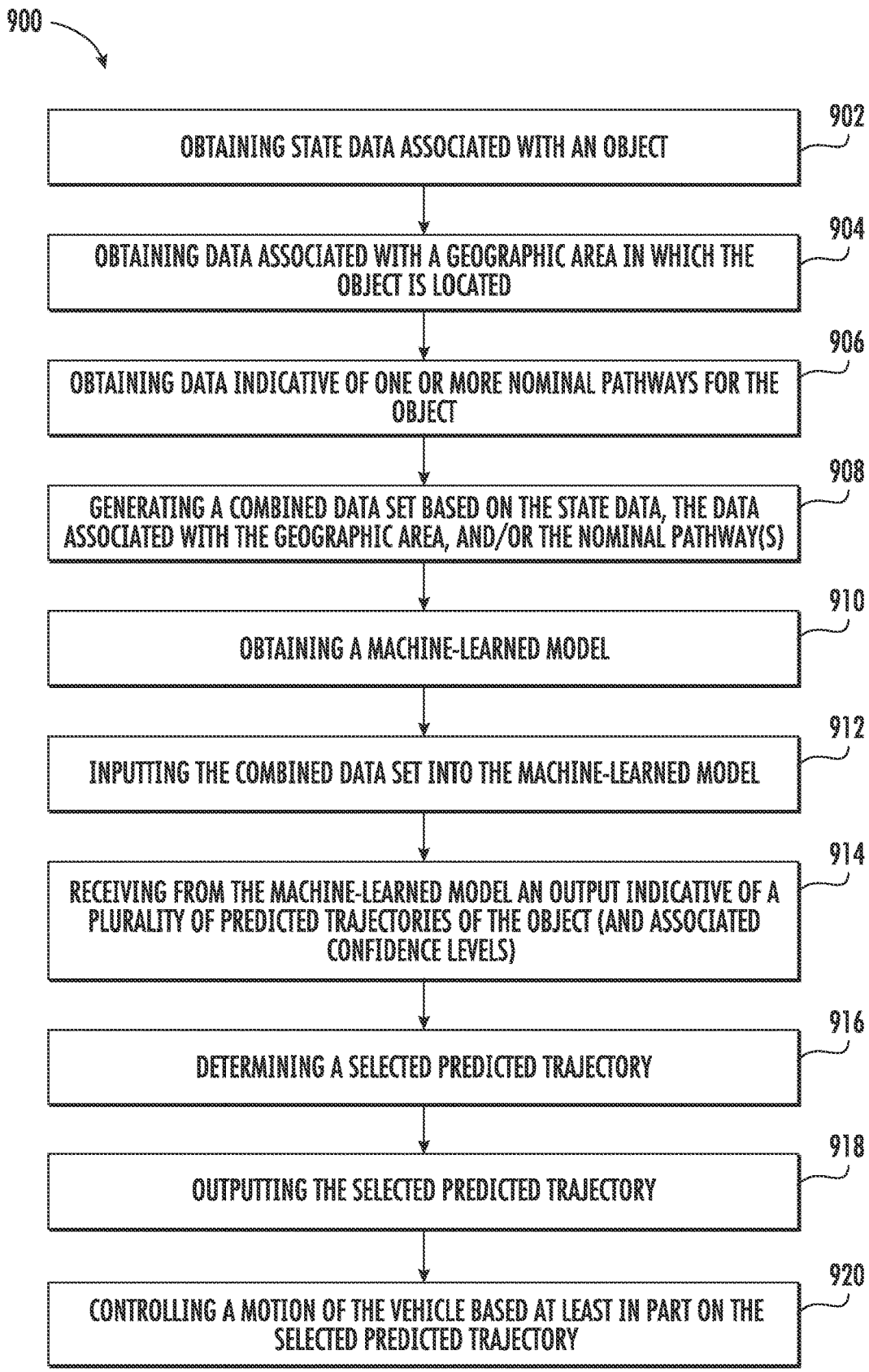
FIG. 9 depicts a flow diagram of another example method of predicting object motion and controlling autonomous vehicles according to example embodiments of the present disclosure.

FIG. 9 depicts a flow diagram of an example method 900 of predicting object motion and controlling autonomous vehicles according to example embodiments of the present disclosure. One or more portion(s) of the method 900 can be implemented by one or more computing devices such as, for example, the one or more computing device(s) of the vehicle computing system 102 and/or other systems. Each respective portion of the method 900 can be performed by any (or any combination) of the one or more computing devices. Moreover, one or more portion(s) of the method 900 can be implemented as an algorithm on the hardware components of the device(s) described herein (e.g., as in FIGS. 1 and 7), for example, to predict object motion and control an autonomous vehicle. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (902), the method 900 can include obtaining state data associated with an object. For instance, the vehicle computing system 102 can obtain state data 130 indicative of at least a current or past state of an object that is within a surrounding environment of a vehicle 104. For example, the vehicle computing system 102 can obtain state data 130 associated with an object 810 (e.g., a vehicle) within the surrounding environment of the vehicle 104. The state data 130 associated with the object 810 can include the heading, location, speed, and/or other information associated with the object 810, at one or more times. At (904), the method 900 can include obtaining data associated with a geographic area in which the object is located. For example, the vehicle computing system 102 can obtain data associated with a geographic area in which the object 810 is located. The data associated with the geographic area in which the object 810 is located can include at least one of map data 120 associated with the geographic area, sensor data 118 associated with the geographic area (e.g., sensor data 118 acquired within the geographic area and/or otherwise indicative of feature(s) of the geographic area), satellite image data associated with the geographic area 204 (e.g., overhead aerial imagery), and/or other types of data.

At (906), the method 900 can include obtaining data indicative of one or more nominal pathways for the object. For instance, the vehicle computing system 102 can obtain data indicative of one or more nominal pathways for the object 810. As described herein, this can be indicative of the typical pathways that an object of the type similar to object 810 may undertake in the same (or similar) circumstances.

At (908), the method 900 can include generating a combined data set 137 based at least in part on the state data, the data associated with the geographic area, and/or the data indicative of the nominal pathway(s). For example, the vehicle computing system 102 can generate a combined data set 137 associated with the object 810 based at least in part on a fusion of the state data 130, the data associated with the geographic area in which the object 810 is located. In some implementations, the combined data set 137 can be generated based at least in part on the one or more nominal pathways of the object 810 (e.g., the fusion of the data indicative of the nominal pathway(s)). The vehicle computing system 102 can generate image data based at least in part on the fusion of the state data 130 and the data associated with the geographic area in which the object 810 is located (and/or the nominal pathway data).

The state data 130 and the data associated with the geographic area in which the object 810 is located can be encoded within the image data. For example, the image data can include one or more images (e.g., one or more rasterized images) that include the object 810. Each of the one or more images (e.g., rasterized image(s)) can be encoded with one or more features. Each of the one or more features can be encoded to a different channel of a plurality of channels (e.g., of the images). In some implementations, the nominal pathway(s) can be encoded into another channel of the images.

At (910), the method 900 can include obtaining a machine-learned model. For instance, the vehicle computing system 102 can obtain data indicative of a model 136. The model 136 can be a machine-learned model such as, for example, a machine-learned model that includes a deep neural network, a convolutional neural network, and/or other types of machine-learned models.

At (912), the method 900 can include inputting the combined data set into the machine-learned model. For instance, the vehicle computing system 102 can input the combined data set 137 into the model 136 (e.g., the machine-learned model). By way of example, the vehicle computing system 102 can input the image data into the model 136 (e.g., the machine-learned model). The model 136 (e.g., the machine-learned model) can be configured to determine the plurality of predicted trajectories 805A-B of the object 810 based at least in part on the image data. In some implementations, the vehicle computing system 102 can input one or more images (e.g., one or more rasterized images) into the model 136 (e.g., the machine-learned model). The model 136 can be configured to determine the plurality of predicted trajectories 805A-B of the object 810 based at least in part on the one or more images (e.g., rasterized image(s)). In some implementations, the model 136 can be configured to receive one or more features (e.g., encoded within the images) via a plurality of channels, as described herein.

At (914), the method 900 can include receiving, from the machine-learned model, an output indicative of a plurality of predicted trajectories of the object. For instance, the vehicle computing system 102 can receive an output 800 from the model 136 (e.g., machine-learned model). The output 800 can be indicative of the plurality of predicted trajectories 805A-B of the object 810. As described herein, each of the plurality of predicted trajectories 805A-B can be associated with a respective trajectory confidence level 825A-B. The output 800 can be further indicative of the respective trajectory confidence levels 825A-B associated with the predicted trajectories 805A-B. Each of the predicted trajectories can include a plurality of predicted way-points of the object 810. Each predicted way-point (e.g., first way-point 820A) can be associated with a way-point confidence level (e.g., first way-point confidence level 815A). As described herein, the output 800 can be further indicative of the respective way-point confidence levels associated with the predicted way-points.

At (916), the method 900 can include determining a selected predicted trajectory. For instance, the vehicle computing system 102 can determine a selected predicted trajectory of the object 810 from among the plurality of predicted trajectories of the object. As described herein, the model 136 can be trained to make such a selection (e.g., trained based on closeness to a ground truth). The vehicle computing system 102 can output data indicative of the selected predicted trajectory, at (918). For instance, the data indicative of the selected predicted trajectory can be outputted to a motion planning system 128 of the vehicle 104. At (920), the method 900 can include controlling a motion of the vehicle based at least in part on the selected predicted trajectory. The vehicle computing system 102 can control a motion of the vehicle 104 based at least in part on the output 800 from the model 136 (e.g., the machine-learned model). For instance, the vehicle computing system 102 can control a motion of the vehicle 104 based at least in part on the selected predicted trajectory. The vehicle computing system 102 can generate a motion plan for the vehicle 104 based at least in part on the output 800, as described herein. The vehicle computing system 102 can cause the vehicle 104 to travel in accordance with this motion plan.

Figure 7:
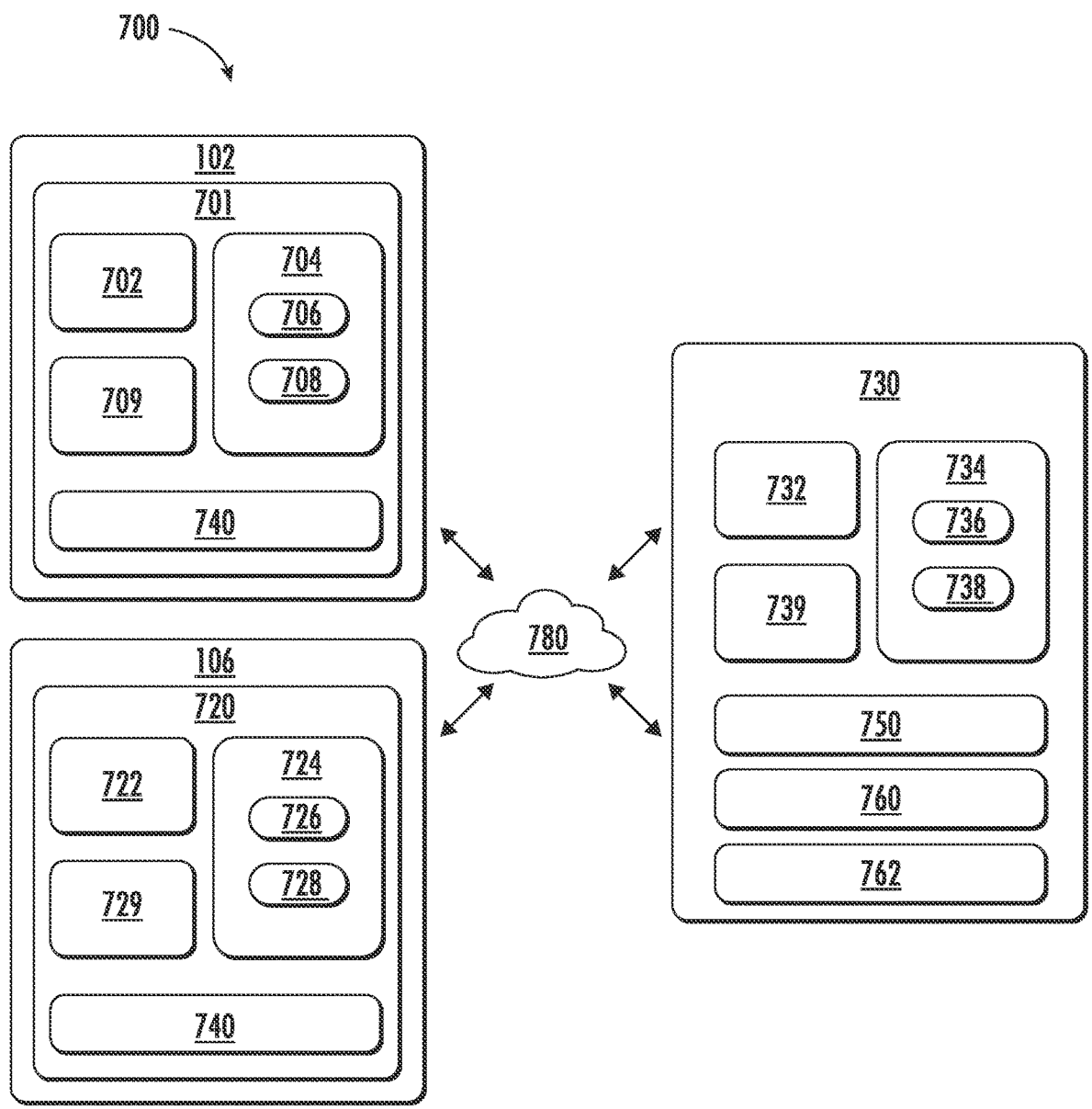
FIG. 7 depicts example system components according to example embodiments of the present disclosure.

FIG. 7 depicts example system components of an example system 700 according to example embodiments of the present disclosure. The example system 700 can include the vehicle computing system 102, the operations computing system 106, and a machine learning computing system 730 that are communicatively coupled over one or more network(s) 780. The vehicle computing system 102 can include one or more computing device(s) 701. The computing device(s) 701 of the vehicle computing system 102 can include processor(s) 702 and a memory 704 (e.g., onboard the vehicle 104). The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 can store instructions 706 that when executed by the one or more processors 702 cause the one or more processors 702 (the computing system 102) to perform operations such as any of the operations and functions of the vehicle computing system 102, the vehicle 104, or for which the vehicle computing system 102 and/or the vehicle 104 are configured, as described herein, the operations for predicting object motion and/or controlling an autonomous vehicle (e.g., one or more portions of method 600), and/or any other functions for the vehicle computing system 102, as described herein.

The memory 704 can store data 708 that can be obtained, received, accessed, written, manipulated, created, and/or stored. The data 708 can include, for instance, sensor data, state data, predicted data, data associated with a geographic area, input data, data indicative of machine-learned model(s), data indicative of model outputs, motion planning data, and/or other data/information described herein. In some implementations, the computing device(s) 701 can obtain data from one or more memory device(s) that are remote from the vehicle 104.

The computing device(s) 701 can also include a communication interface 709 used to communicate with one or more other system(s) on-board the vehicle 104 and/or a remote computing device that is remote from the vehicle 104 (e.g., the other systems of FIG. 700, etc.). The communication interface 709 can include any circuits, components, software, etc. for communicating via one or more networks (e.g., 780). In some implementations, the communication interface 709 can include for example, one or more of a communications controller, receiver, transceiver, transmitter, port, conductors, software and/or hardware for communicating data/information.

The operations computing system 106 can perform the operations and functions for managing vehicles (e.g., a fleet of autonomous vehicles). The operations computing system 106 can be located remotely from the vehicle 104. For example, the operations computing system 106 can operate offline, off-board, etc. The operations computing system 106 can include one or more distinct physical computing devices.

The operations computing system 106 can include one or more computing devices 720. The one or more computing devices 720 can include one or more processors 722 and a memory 724. The one or more processors 722 can be any suitable processing device (e.g., a processor core, a microprocessor, an ASIC, a FPGA, a controller, a microcontroller, etc.) and can be one processor or a plurality of processors that are operatively connected. The memory 724 can include one or more non-transitory computer-readable storage media, such as RAM, ROM, EEPROM, EPROM, one or more memory devices, flash memory devices, etc., and combinations thereof.

The memory 724 can store information that can be accessed by the one or more processors 722. For instance, the memory 724 (e.g., one or more non-transitory computer-readable storage mediums, memory devices) can store data 726 that can be obtained, received, accessed, written, manipulated, created, and/or stored. The data 726 can include, for instance, data indication of model(s), map data, data associated with a geographic area, and/or other data or information described herein. In some implementations, the operations computing system 106 can obtain data from one or more memory device(s) that are remote from the operations computing system 106.

The memory 724 can also store computer-readable instructions 728 that can be executed by the one or more processors 722. The instructions 728 can be software written in any suitable programming language or can be implemented in hardware. Additionally, or alternatively, the instructions 728 can be executed in logically and/or virtually separate threads on processor(s) 722. For example, the memory 724 can store instructions 728 that when executed by the one or more processors 722 cause the one or more processors 722 to perform any of the operations and/or functions described herein, including, for example, any of the operations and functions of the operations computing system 106, as well as one or more portions of method 600 and/or other operations and functions.

The computing device(s) 720 can also include a communication interface 729 used to communicate with one or more other system(s). The communication interface 729 can include any circuits, components, software, etc. for communicating via one or more networks (e.g., 780). In some implementations, the communication interface 729 can include for example, one or more of a communications controller, receiver, transceiver, transmitter, port, conductors, software and/or hardware for communicating data/information.

According to an aspect of the present disclosure, the vehicle computing system 102 and/or the operations computing system 106 can store or include one or more machine-learned models 740. As examples, the machine-learned models 740 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The machine-learned models 740 can include the model 136, as described herein.

In some implementations, the vehicle computing system 102 and/or the operations computing system 106 can receive the one or more machine-learned models 740 from the machine learning computing system 730 over the network(s) 780 and can store the one or more machine-learned models 740 in the memory of the respective system. The vehicle computing system 102 and/or the operations computing system 106 can use or otherwise implement the one or more machine-learned models 740 (e.g., by processor(s) 702, 722). In particular, the vehicle computing system 102 and/or the operations computing system 106 can implement the machine learned model(s) 740 to predict object motion (e.g., determine a predicted trajectory, velocity, heading, bounding box, etc. of an object), as described herein. The machine learning computing system 730 can include one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage media, such as RAM, ROM, EEPROM, EPROM, one or more memory devices, flash memory devices, etc., and combinations thereof.

The memory 734 can store information that can be accessed by the one or more processors 732. For instance, the memory 734 (e.g., one or more non-transitory computer-readable storage mediums, memory devices) can store data 736 that can be obtained, received, accessed, written, manipulated, created, and/or stored. In some implementations, the machine learning computing system 730 can obtain data from one or more memory devices that are remote from the system 730.

The memory 734 can also store computer-readable instructions 738 that can be executed by the one or more processors 732. The instructions 738 can be software written in any suitable programming language or can be implemented in hardware. Additionally, or alternatively, the instructions 738 can be executed in logically and/or virtually separate threads on processor(s) 732. The memory 734 can store the instructions 738 that when executed by the one or more processors 732 cause the one or more processors 732 to perform operations. The machine learning computing system 730 can include a communication system 739, similar to that of the vehicle computing system 102 and/or the operations computing system 106.

In some implementations, the machine learning computing system 730 can include one or more server computing devices. If the machine learning computing system 730 includes multiple server computing devices, such server computing devices can operate according to various computing architectures, including, for example, sequential computing architectures, parallel computing architectures, or some combination thereof.

In addition or alternatively to the model(s) 740 at the vehicle computing system 102 and/or the operations computing system 106, the machine learning computing system 730 can include one or more machine-learned models 750. As examples, the machine-learned models 750 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks, or other forms of neural networks. The machine-learned models 750 can be similar to and/or the same as the machine-learned models 740.

As an example, the machine learning computing system 730 can communicate with the vehicle computing system 102 and/or the operations computing system 106 according to a client-server relationship. For example, the machine learning computing system 730 can implement the machine-learned models 750 to provide a web service to the vehicle computing system 102 and/or the operations computing system 106. For example, the web service can provide machine-learned models to an entity associated with an autonomous vehicle; such that the entity can implement the machine-learned model (e.g., to determine predicted object trajectories, etc.). Thus, machine-learned models 750 can be located and used at the vehicle computing system 102 and/or the operations computing system 106 and/or machine-learned models 750 can be located and used at the machine learning computing system 730.

In some implementations, the machine learning computing system 730, the vehicle computing system 102, and/or the operations computing system 106 can train the machine-learned models 740 and/or 750 through use of a model trainer 760. The model trainer 760 can train the machine-learned models 740 and/or 750 using one or more training or learning algorithms. One example training technique is backwards propagation of errors. In some implementations, the model trainer 760 can perform supervised training techniques using a set of labeled training data. In other implementations, the model trainer 760 can perform unsupervised training techniques using a set of unlabeled training data. The model trainer 760 can perform a number of generalization techniques to improve the generalization capability of the models being trained. Generalization techniques include weight decays, dropouts, or other techniques.

In particular, the model trainer 760 can train a machine-learned model 740 and/or 750 based on a set of training data 762. The training data 762 can include, for example, a number of sets of data from previous events (e.g., previously obtained state data, previous obtain data associated with a geographic area). The training data 762 can be associated with a previously observed trajectory of the object, which can allow the training data 762 to train a model based on real-world object motion and the data associated therewith. In some implementations, the training data 762 can be taken from the same geographic area (e.g., city, state, and/or country) in which an autonomous vehicle utilizing that model 740/750 is designed to operate. In this way, the models 740/750 can be trained to determine outputs (e.g., predicted future trajectories, one or more predicted future locations) in a manner that is tailored to the customs of a particular region. The model trainer 760 can be implemented in hardware, firmware, and/or software controlling one or more processors.

The models 740/750 can be trained according to the loss functions described herein to determine a plurality of predicted trajectories for an object as well as one or more confidence levels (e.g., trajectory confidence levels, way-point confidence levels). In some implementations, the models 740/750 can be trained using one or more generative adversarial networks (GAN(s)). The GAN(s) can be utilized, for example, within an unsupervised machine learning environment. Moreover, such a training approach can include two networks: a generator network (e.g., a CNN) and a discriminator network (e.g., a DNN). A training dataset can be used to train the discriminator network (e.g., by presenting the training data to the network until it achieves certain accuracy). This training dataset can include one or more rasterized images, as described herein. During training, the generator network can aim to fool the discriminator network (e.g., to increase the error rate of the discriminator network). Backpropagation can be applied in the generator and discriminator networks so that the discriminator network becomes more skilled at distinguishing between the true data distribution and those produced by the generator network.

The network(s) 780 can be any type of network or combination of networks that allows for communication between devices. In some embodiments, the network(s) 780 can include one or more of a local area network, wide area network, the Internet, secure network, cellular network, mesh network, peer-to-peer communication link and/or some combination thereof and can include any number of wired or wireless links. Communication over the network(s) 780 can be accomplished, for instance, via a network interface using any type of protocol, protection scheme, encoding, format, packaging, etc.

FIG. 7 illustrates one example system 700 that can be used to implement the present disclosure. Other computing systems can be used as well. For example, in some implementations, the vehicle computing system 102 and/or the operations computing system 106 can include the model trainer 760 and the training dataset 762. In such implementations, the machine-learned models 740 can be both trained and used locally at the vehicle computing system 102 and/or the operations computing system 106. As another example, in some implementations, the vehicle computing system 102 and/or the operations computing system 106 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle control system comprising:
   one or more processors; and
   one or more computer-readable medium storing instructions executable by the one or more processors to cause the control system to perform operations, the operations comprising:
   obtaining state data indicative of at least a current state or a past state of an object that is within a surrounding environment of an autonomous vehicle;
   providing input data descriptive of the state data indicative of at least the current state or the past state of the object to a machine-learned model;
   receiving as an output of the machine-learned model, in response to receipt of the input data, an output indicative of a plurality of predicted trajectories of the object, the plurality of predicted trajectories comprising a plurality of predicted waypoints, wherein the plurality of predicted waypoints is associated with a waypoint confidence level indicative of per-waypoint uncertainty for the plurality of predicted waypoints; and
   controlling a motion of the autonomous vehicle based on the waypoint confidence level.

2. The control system of claim 1, wherein the operations further comprise:
   displaying an indicator indicative of the waypoint confidence level for the plurality of predicted waypoints.

3. The control system of claim 1, wherein the plurality of predicted waypoints for a predicted trajectory comprises a first waypoint and a second waypoint, wherein the first waypoint comprises a first indicator indicative of a first waypoint confidence level for the first waypoint, wherein the second waypoint comprises a second indicator indicative of a second confidence level for the second waypoint.

4. The control system of claim 1, wherein providing the input data descriptive of the state data indicative of at least the current state or the past state of the object to the machine-learned model comprises:
   obtaining data associated with a geographic area in which the object is located; and
   generating the input data based on the state data and the data associated with the geographic area in which the object is located, wherein the input data comprises a combined data set associated with the object based on a fusion of the state data and the data associated with the geographic area in which the object is located.

5. The control system of claim 1, wherein controlling the motion of the autonomous vehicle based on the waypoint confidence level comprises:
   determining a trajectory confidence level for the plurality of predicted trajectories based on the waypoint confidence level;
   determining a selected predicted trajectory of the object from among the plurality of predicted trajectories of the object based the trajectory confidence level for the selected predicted trajectory; and
   controlling the motion of the autonomous vehicle based on the selected predicted trajectory.

6. The control system of claim 1, wherein the plurality of predicted waypoints are respectively indicative of a predicted future location for the object.

7. The control system of claim 6, wherein the predicted future location for the object is relative to one or more features of a geographic area in which the object is located.

8. The control system of claim 6, wherein the plurality of predicted waypoints respectively comprise an indicator indicative of the waypoint confidence level for the predicted waypoint, and wherein the indicator indicative of the waypoint confidence level for the predicted waypoint quantifies an uncertainty of the predicted future location for the object.

9. The control system of claim 1, wherein the machine-learned model is previously trained to determine a respective waypoint confidence level for each of a plurality of respective waypoints of a respective trajectory for a respective object based on input data corresponding to the respective object.

10. An autonomous vehicle comprising:
    one or more processors; and
    one or more computer-readable medium storing instructions executable by the one or more processors to cause the autonomous vehicle to perform operations, the operations comprising:
    obtaining state data indicative of at least a current state or a past state of an object that is within a surrounding environment of an autonomous vehicle;
    providing input data descriptive of the state data indicative of at least the current state or the past state of the object to a machine-learned model;
    receiving as an output of the machine-learned model, in response to receipt of the input data, an output indicative of a plurality of predicted trajectories of the object, the plurality of predicted trajectories comprising a plurality of predicted waypoints, wherein at of the plurality of predicted waypoints is associated with a waypoint confidence level indicative of per-waypoint uncertainty for the plurality of predicted waypoints; and
    controlling, a motion of the autonomous vehicle based on the waypoint confidence level.

11. The autonomous vehicle of claim 10, wherein providing the input data descriptive of the state data indicative of at least the current state or the past state of the object to the machine-learned model comprises:
    obtaining data indicative of one or more nominal pathways for the object; and
    generating the input data based on the state data and the data indicative of the one or more nominal pathways for the object, wherein the input data comprises a combined data set associated with the object based on the state data and the data indicative of one or more nominal pathways for the object.

12. The autonomous vehicle of claim 10, wherein providing the input data descriptive of the state data indicative of at least the current state or the past state of the object to the machine-learned model comprises:
- obtaining data associated with a geographic area in which the object is located; and
- generating the input data based on the state data and the data associated with the geographic area in which the object is located, wherein the input data comprises a combined data set associated with the object based on a fusion of the state data and the data associated with the geographic area in which the object is located.

13. The autonomous vehicle of claim 10, wherein controlling the motion of the autonomous vehicle based on the waypoint confidence level for the plurality of predicted waypoints, comprises:
- determining a trajectory confidence level for the plurality of predicted trajectories based on the waypoint confidence level;
- determining a selected predicted trajectory of the object from among the plurality of predicted trajectories of the object based on the trajectory confidence level for the selected predicted trajectory; and
- controlling the motion of the autonomous vehicle based on the selected predicted trajectory.

14. The autonomous vehicle of claim 10, wherein the plurality of predicted waypoints for the predicted trajectory comprises a first waypoint and a second waypoint, wherein the first waypoint comprises a first indicator indicative of a first waypoint confidence level for the first waypoint, wherein the second waypoint comprises a second indicator indicative of a second confidence level for the second waypoint.

15. A computer-implemented method, comprising:
- obtaining state data indicative of at least a current state or a past state of an object that is within a surrounding environment of an autonomous vehicle;
- providing input data descriptive of the state data indicative of at least the current state or the past state of the object to a machine-learned model;
- receiving as an output of the machine-learned model, in response to receipt of the input data, an output indicative of a plurality of predicted trajectories of the object, the plurality of predicted trajectories comprising a plurality of predicted waypoints, wherein the plurality of predicted waypoints is associated with a waypoint confidence level indicative of per-waypoint uncertainty for the plurality of predicted waypoints; and
- controlling a motion of the autonomous vehicle based on the waypoint confidence level.

16. The computer-implemented method of claim 15, wherein the plurality of predicted waypoints for predicted trajectory comprises a first waypoint and a second waypoint, wherein the first waypoint comprises a first indicator indicative of a first waypoint confidence level for the first waypoint, wherein the second waypoint comprises a second indicator indicative of a second confidence level for the second waypoint.

17. The computer-implemented method of claim 15, wherein the machine-learned model is previously trained to determine a respective waypoint confidence level for each of a plurality of respective waypoints of a respective trajectory for a respective object based on input data corresponding to the respective object.

18. The computer-implemented method of claim 17, wherein the machine-learned model is previously trained based on training data, wherein the training data is associated with a plurality of previously observed trajectories for a plurality of objects.

* * * * *